United States Patent
Dave et al.

(10) Patent No.: US 8,972,452 B2
(45) Date of Patent: Mar. 3, 2015

(54) DATA FEEDS PLATFORM

(71) Applicant: Morgan Stanley, New York, NY (US)

(72) Inventors: Bhavin P. Dave, Mumbai (IN); Amit S. Modi, Mumbai (IN)

(73) Assignee: Morgan Stanley, New York, NY (US)

( * ) Notice: Subject to any disclaimer, the term of this patent is extended or adjusted under 35 U.S.C. 154(b) by 127 days.

(21) Appl. No.: 13/795,572

(22) Filed: Mar. 12, 2013

(65) Prior Publication Data

US 2014/0279826 A1    Sep. 18, 2014

(51) Int. Cl.
G06F 7/00    (2006.01)
G06F 17/30    (2006.01)

(52) U.S. Cl.
CPC .................. *G06F 17/30563* (2013.01)
USPC .......................................................... 707/796

(58) Field of Classification Search
USPC ......................................................... 707/796
See application file for complete search history.

(56) References Cited

U.S. PATENT DOCUMENTS

2012/0194362 A1\* 8/2012 Fallon et al. .................... 341/87

\* cited by examiner

*Primary Examiner* — Truong Vo
(74) *Attorney, Agent, or Firm* — Weitzman Law Offices, LLC

(57) ABSTRACT

A data feeds platform, comprising a data feed using a data feed protocol. The data feed protocol comprises, a feed header defining at least one identification attribute, a data header defining a data structure comprising data nodes, each data node corresponding to a subset of the data, and a data section, the data section storing the data according to the data structure. A plurality of heterogeneous data protocols is stored. A data input is received in one of the plurality of heterogeneous data protocols. The data input is converted to the data feed protocol, creating the data feed.

23 Claims, 21 Drawing Sheets

FIG. 13

DATA FEEDS PLATFORM

BACKGROUND

1. Field

This disclosure relates generally to multiple computer systems and process coordinating, and, more particularly, to computer-to-computer data modification.

2. Background

Entities often utilize centralized data servers to house information. These centralized data servers may need to interact with any number of external heterogeneous systems. However, the heterogeneous systems may utilize different data protocols, or have alternate means of performing actions on the data. The centralized data servers may therefore be required to accommodate a large number of different data formats and action representations. Data flow management for the centralized server is also left to independent implementation, often utilizing ad-hoc solutions. As a result, these systems may lack sufficient functionality for controlling the granularity of data updates, issuing alerts and notifications, identification of data flows, and tracking the life cycle of data flows.

BRIEF SUMMARY

In one aspect of this disclosure, a method of implementing a data feeds platform utilizing a data feed protocol is disclosed, the method comprising receiving, using a processor, data in one of a plurality of heterogeneous data protocols. Identifying information is extracted from the data and the extracted identifying information is stored in a feed header of a new data feed, the extracted identifying information corresponding to a type of identifying information specified for inclusion in a data protocol of the new data feed. Subsets of the data are organized according to a data structure, each subset corresponding to a data node of the data structure defined in a data header of the data protocol of the new data feed. The data is stored in a data section of the data feed. The new data feed is transmitted to a data warehouse.

In another aspect of this disclosure, a data feeds platform is disclosed, comprising a computer processor, and computer memory, within which is defined a data feed protocol. The data feed protocol comprises a feed header, the feed header defining at least one identification attribute of the data feed, a data header, the data header defining a data structure of data to be transmitted in the data feed, the data structure comprising data nodes, each data node corresponding to a subset of the data, and a data section, the data section storing the data according to the data structure defined in the data header. The computer memory contains program instructions, which, when executed, causes the computer processor to store a plurality of heterogeneous data protocols. A data input is received in one of the plurality of heterogeneous data protocols. The data input is converted from the one of the plurality of heterogeneous data protocols to the data feed protocol, creating the data feed. The data feed is sent to a data warehouse.

The foregoing has outlined rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which:

FIGS. 6-14 are screen shots of an illustrative software wizard that may be used to configure the data feeds platform and data feed protocol.

DETAILED DESCRIPTION

This application discloses a data feeds platform that utilizes a data feed protocol to standardize stored information that may be received in a plurality of heterogeneous formats and protocols. The data feed protocol enables meta-data driven data flow definition, delivery, and tracking. By interposing a data feeds platform and protocol between external systems and the centralized data system, each external system can send its data in its native form and format without regard to the centralized data system or other systems to which that data might later be provided, avoiding the need to individually account for the semantics of representing data, the representation of actions performed on the data, or a potentially large number of diverse critical monitoring systems. The data feeds platform and data feed protocol greatly facilitate the creation and operation of meta-data-driven centrally-managed data warehouses by supporting standard representation of data, standard representation of actions performed on data, support for controlling the granularity of actions and update operations, unique identification of data feeds, and support of intersystem acknowledgement (or non-acknowledgement) handshakes.

Figure 1:
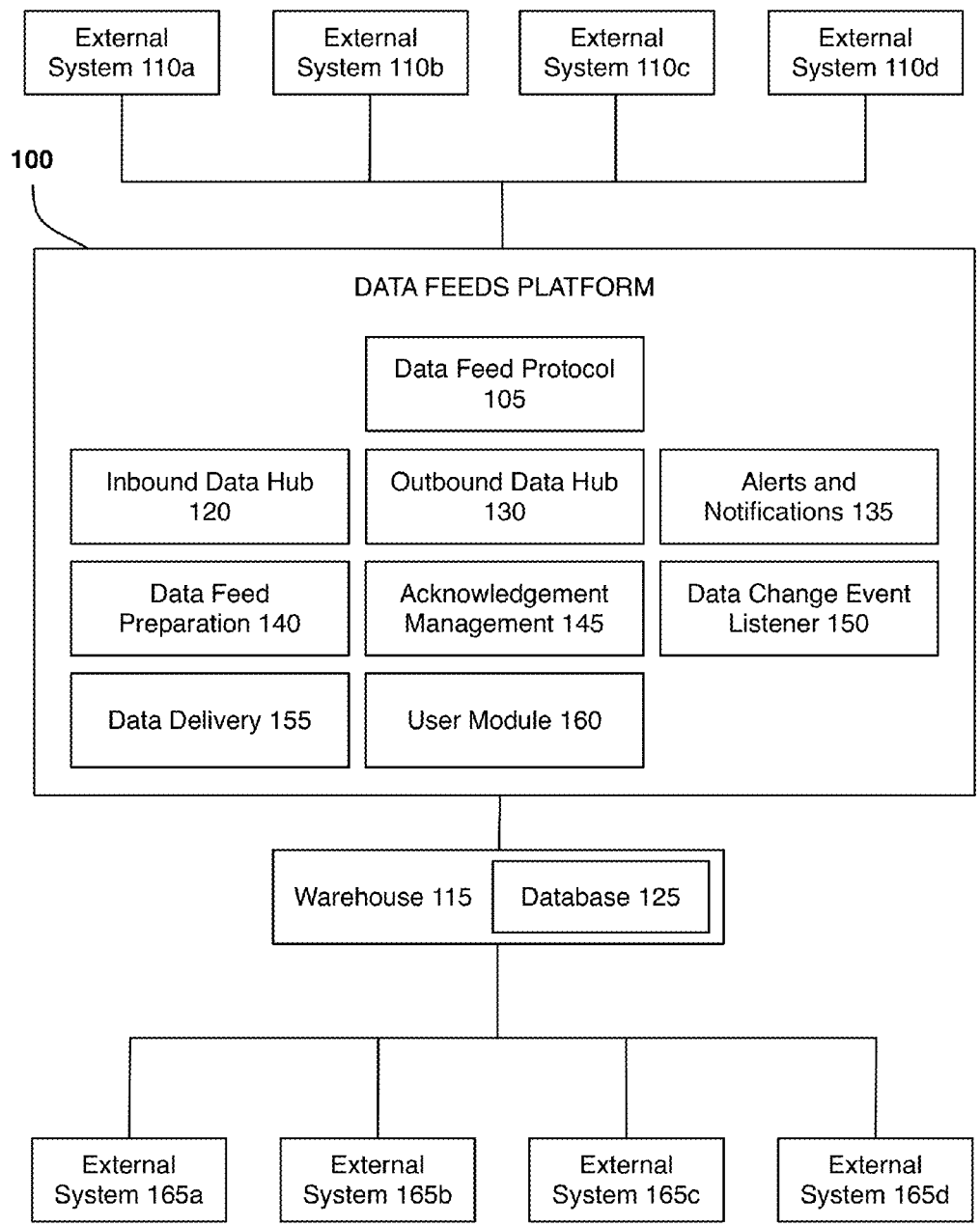
FIG. 1 is a high level representation of an illustrative data feeds platform.

FIG. 1 is a high level representation of an illustrative data feeds platform 100 utilizing the data feed protocol 105. The data feeds platform 100 is configured to receive data from illustrative external systems 110a-110d, convert them to the format defined within and dictated by the data feed protocol 105, and then send them to the data warehouse 115 for storage. The transmitted and converted data is treated as a data "feed," or a discrete body of information having an internal structure defined by the data feed protocol. The external systems 110a-110d may represent any number of external heterogeneous systems having any number of diverse formats and information formats. The data feeds platform 100 has the required data format information to allow the data feeds platform 100 to receive and translate the information into the data feed protocol 105.

The data feeds platform 100 may have other functional modules according to the user's required utility. An inbound data hub 120 may centralize the receipt of data from external systems 110a-110b or from the data warehouse 115. An outbound data hub 130 may centralize the transmission of data to external systems 110a-110b or the data warehouse 115. An alerts and notifications module 135 may manage the generation and transmission of alerts and notifications to relevant parties. For example, a certain data trigger may cause the data change event listener 150 to activate the alerts and notifications module 135 to generate an e-mail alert to an administrator that the listened-for event has occurred. A data feed preparation module 140 may prepare outbound data feeds for transmission outside systems, such as the external systems 165a-165d, which may represent another group of heterogeneous systems (which may overlap with the external systems 110a-11d) having any number of disparate information formats. The data feed preparation module 140 may therefore translate information from the data feed protocol to whatever external format is required for each respective external system 165a-165d. An acknowledgement module 145 may generate acknowledgements to be sent by the data feeds platform 100 to acknowledge the receipt of data from other systems. A data change event listener module 150 may be set to listen for particular events in incoming data, and trigger the appropriate response when those events are detected. A data delivery module 155 may coordinate the insertion of data records into the database 125. A user module 160 may allow administrators to monitor status, issue commands and otherwise administrate the operation of the data feeds platform 100.

The data warehouse 115 represents a centralized or decentralized data repository as may be desired for the particular implementation. Once the information from the external systems 110a-110d has been converted to the data feed protocol 105, it is sent to the data warehouse 115 for storage and processing. The data warehouse 115 contains a database module 125 for the storage of data.

Figure 2A:
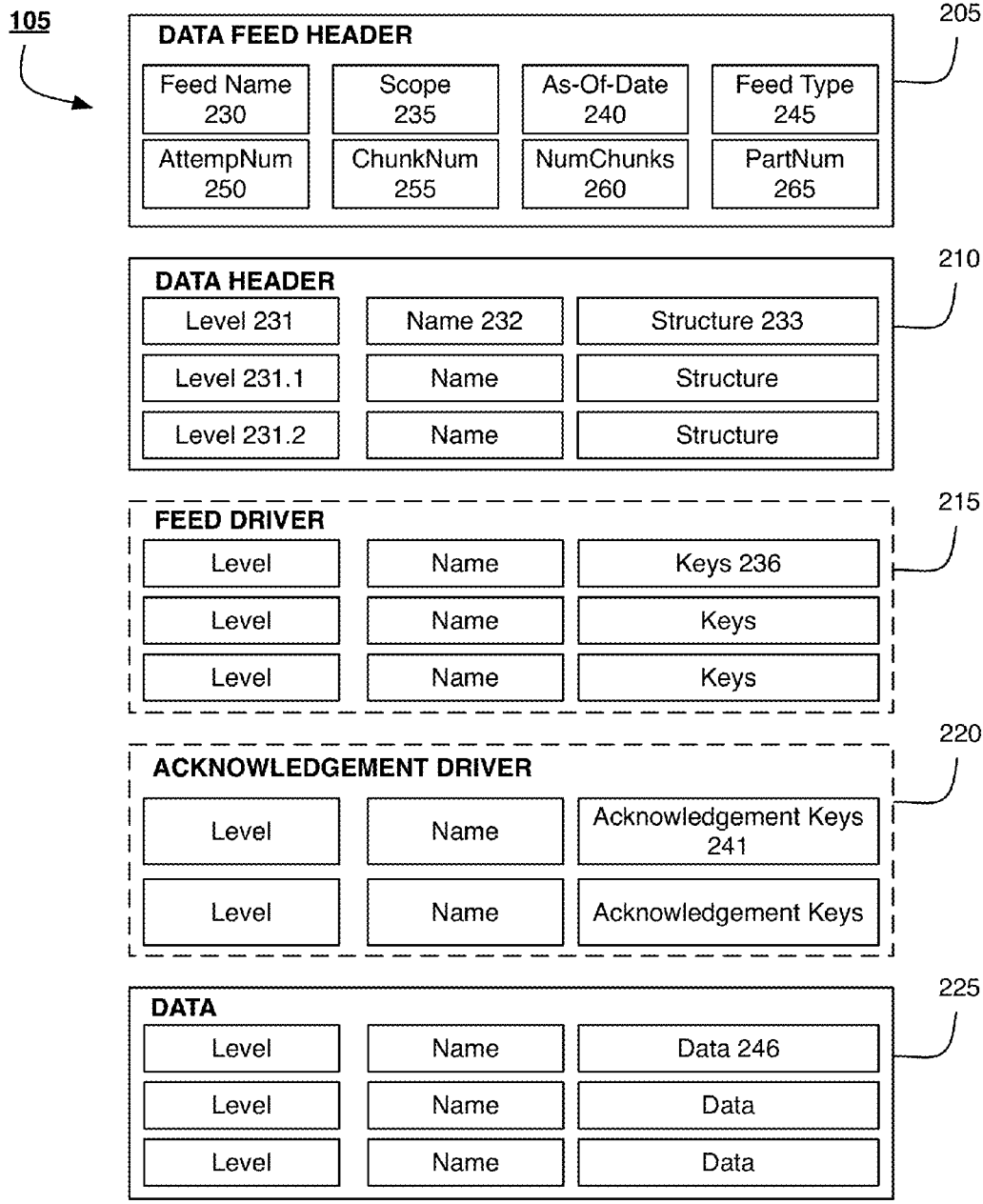
FIG. 2A is a high level representation of an illustrative "full" data feed protocol data structure.

FIG. 2A is a high level representation of an illustrative "full" data feed protocol 105 data structure. This protocol is used when the entirety of a feed is to be stored, as opposed to a "delta" protocol, which will be described later. The full data feed protocol 105 is a pre-defined information format that is used to define and store any kind of data feed involving any kind of data. The full data feed protocol 105 is formed from at least four parts, a data feed header 205, a data header 210, a feed driver 215, and an acknowledgement driver 220. The data feed header 205 contains attributes that form a unique identification tuple for a data feed. The data header 210 defines the structure of the data, and the relationships between related sets of data. The feed driver 215 defines the granularity at which executable actions are controlled.

The data feed header 205 contains attributes that form a unique identification tuple for a data feed. For example, a feed name 210 attribute may specify a name for the to-be-defined data feed. The name may be selected from any desired source or citation. For example, the name may be set as the data type that the data feed will be transmitting. A scope 215 attribute may define whether the feed is "valid until the next update" or "valid for the effective date," indicating whether the underlying data is valid until a further update is received for the data, or that the underlying data is valid only for a particular effective date. An as-of-date 220 may specify an effective date; for example, an effective date may be simply the date on which the data is being transmitted, or was retrieved. A feed type 225 may indicate whether the data feed is to be transmitted in "full" or "delta" modes. When used in conjunction with the scope 215, this delineates the underlying executable action strategy for update, delete and insert operations, the four possible variations being "full" with "valid until the next update," "full" with "valid for the effective date," "delta" with "valid until the next update," and "delta" with "valid for the effective date." These will be described in greater detail below. A part number 265 may indicate (for "delta" data feeds) the number of "delta" feeds that have transpired thus far for the current data feed and for a given as-of/effective date 240, the number incrementing by one each time a "delta" feed is transmitted. An attempt number 250 may identify the current number of delivery attempts. A chunk number 255 may be utilized when a data feed has to be split into multiple files due to size limitations. A number of chunks 260 may indicate the total number of chunks the data feed field was split into.

As shown, the data header 210 defines the structure of the data, and the relationships between related sets of data. For example, a feed file may contain multiple data sets or data nodes. Each data set may have a different structure that may or may not be similar to any other data set within the feed. Therefore, each data set within the feed is identified as a level (such as level 231) having its own identifier, name 232 and data structure 233. The structure 233 may be defined by any desired format, including, but not limited to, comma-separated values. If data sets are related to one another, then the levels may be defined in a hierarchal manner. If they are not related, the levels may be designed as unrelated, in which case the overall structure of may be said to be "flat."

If the levels are defined in a hierarchal manner, a "tree" data structure is defined by the relationship between the different levels. Level 231 may therefore define a data set that may correspond to, for example, a topmost node of a hierarchal tree. Level 231.1 may correspond to a first sub-node data set of level 231, being one level lower than level 231 and having node level 231 as its parent node. Level 231.2 may correspond to a second sub-node of level 231, being on the same level as level 231.1, and also having level 231 as its parent node. Sub-nodes level 231.1 and 231.2 may have further sub-nodes, as desired. For example, level 231.1 may have sub-nodes 231.1.1, 231.1.2, etc. In this manner, any hierarchal organization of data may be represented in the data feed protocol 105. Of course, different levels may also be unrelated, if the represented data sets are unrelated.

The feed driver 215 optionally defines the granularity at which executable actions are controlled. For example, if a level definition is such that it contains characteristics for a financial portfolio, including all its holdings, the feed driver 215 (if set as the identification for the financial portfolio level) would allow executable actions to treat the entire financial portfolio (including its holdings) as one single atomic unit of work for the purpose of executable actions. Feed driver 215 therefore contains any number of keys 236 for an executable action that specifies the level(s) 231 (defined in the data header 210) that should be treated as atomic units for the purposes of executable actions.

The acknowledgement driver 220 optionally allows specification of specific circumstances in which an acknowledgement should be generated, beyond a standard/generic acknowledgement. The acknowledgement driver 220 contains an acknowledgement key 241 field. Levels to be included in an acknowledgement are specified in the acknowledgement key 241 field. For example, if the acknowledgment driver 220 has a key in its key 241 field, specifying the financial portfolio level described above, then any time an action is performed upon the financial portfolio levels or its sub-levels, an acknowledge will be generated. The resulting acknowledgement may include all individual financial portfolio data sets that were altered as a result of actions performed by the transmission of the data feed.

The data 225 contains the actual relevant data 246 for each level. Each row in the data 225 starts with a level and name that identifies the data set or level to which the row is a member.

Figure 2B:
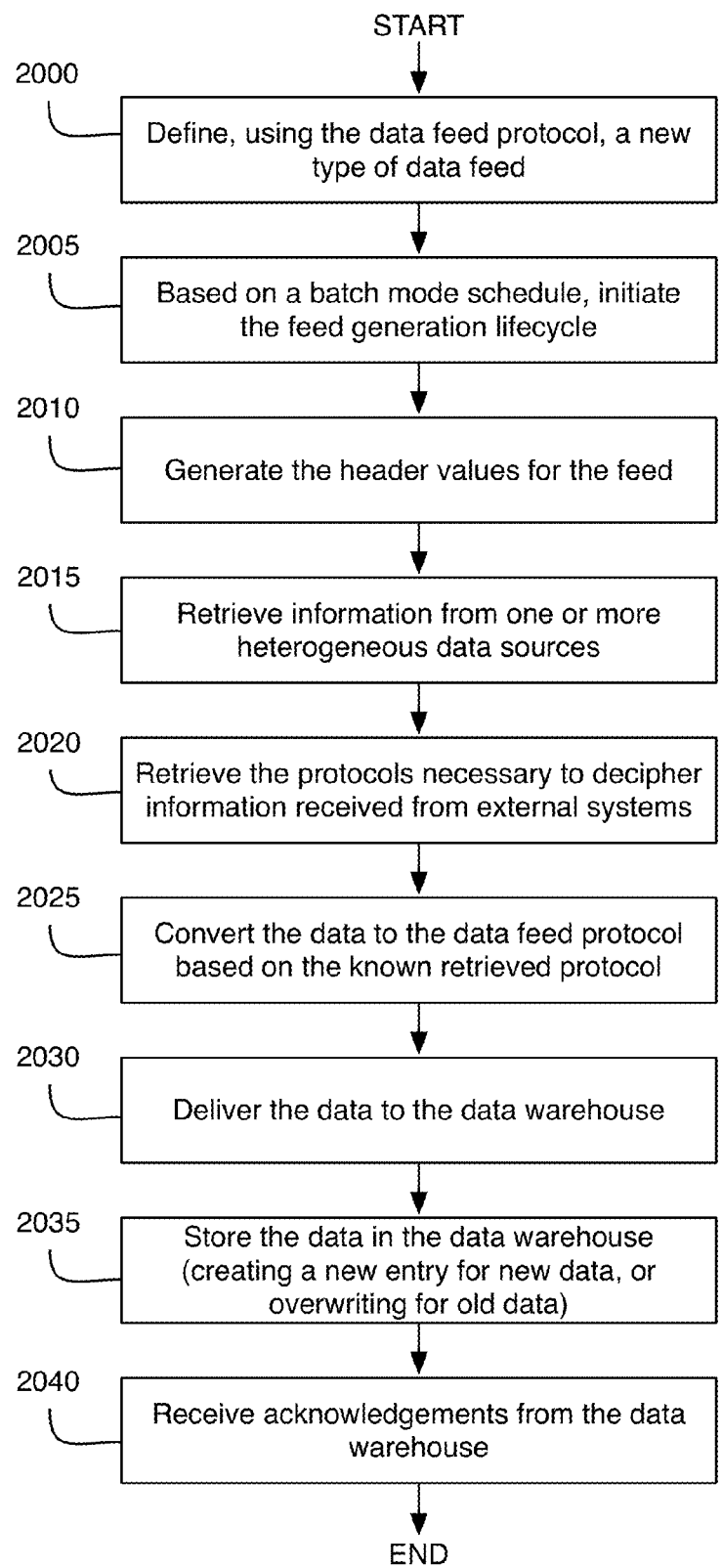
FIGS. 2B and 2C is a flow chart representing an illustrative sequence of steps for implementing the conversion and storage of data according to the data feed protocol.

FIG. 2B is a flow chart representing an illustrative sequence of steps for implementing the conversion and storage of data according to the data feed protocol 105 and data feeds platform 100 under a "pull" mode, in which data feeds are generated based on an internal schedule set on the data feeds platform 100. First, a new data feed is defined using the data feed protocol 105 (step 2000). Subsequently, based on a schedule for the generation of new data feeds (such as a "batch mode" schedule), the data feed generation for the new data feed is initiated (step 2005). Header values, such as the feed name 230, scope 235, and as-of/effective date 240, are generated for the new data feed instance (step 2010). Once the basic structure of the data feed is ready, information to be structured within the new data feed is retrieved from the external heterogeneous data sources 110a-110d (step 2015). Protocols necessary to decipher the retrieved information are then retrieved from the relevant external system (step 2020). The retrieved information is then converted and stored in the data feed according to the data feed protocol 105 based on the retrieved protocol (step 2025). The data, now structured according to the data feed protocol 105, is delivered to the data warehouse by transmitting the populated data feed instance to the data warehouse 115 (step 2030). The data feed is preferably stored by the data warehouse 115, either as a new entry in the case of new data, or overwriting old data if it is an update (step 2035). Finally, the data feeds platform 100 may receive an acknowledgement from the data warehouse 115 confirming that the data feed was received and stored (step 2040).

Figure 2C:
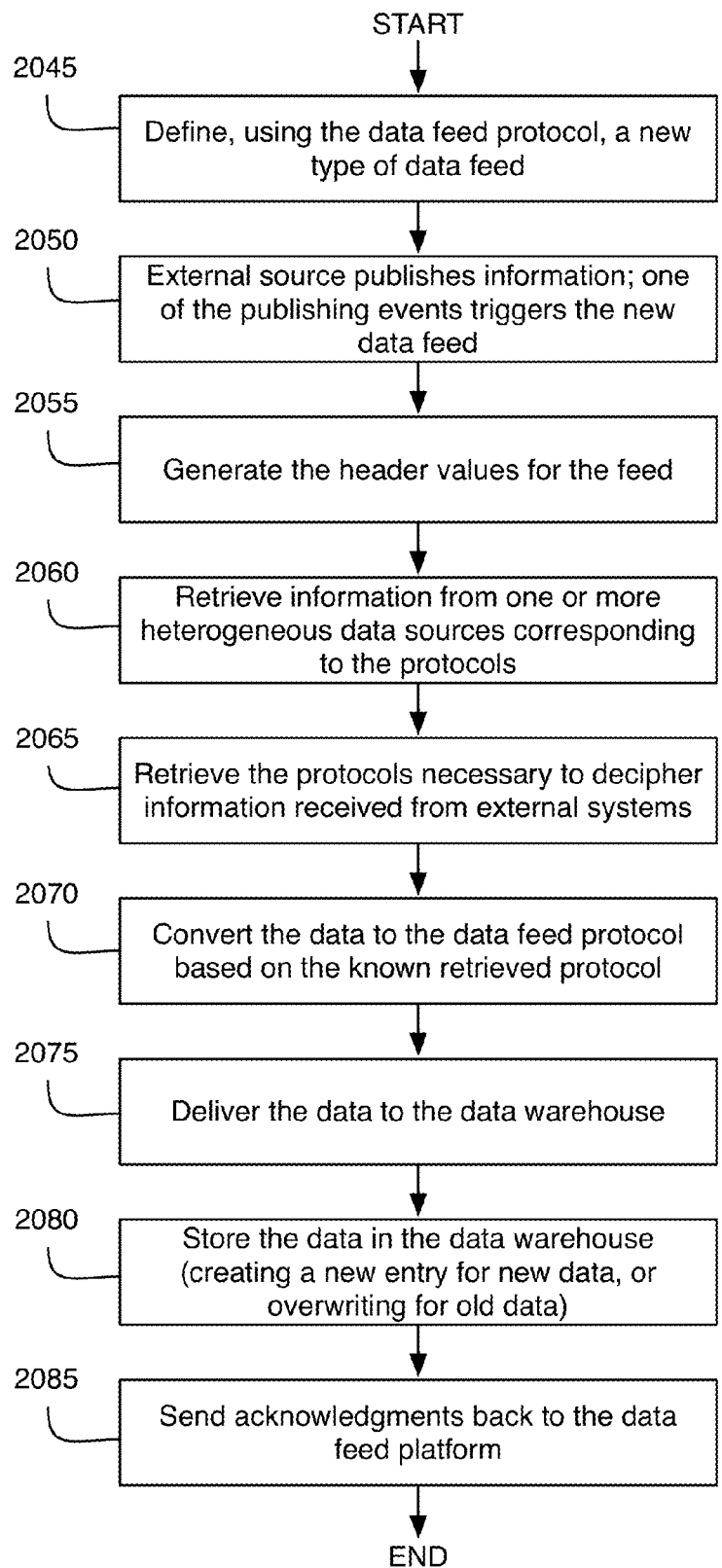

FIG. 2C is a flow chart representing an illustrative sequence of steps for implementing the conversion and storage of data according to the data feed protocol 105 and data feeds platform 100 under a "push" mode, in which data feeds are generated based on events occurring on external systems which may trigger the generation of data feeds. First, a new data feed is defined using the data feed protocol 105 (step 2045). Subsequently, the data feeds platform 100 may detect that one or more external data sources 110a-110d has published information that triggers the generation of the new data feed (step 2050). Header values, such as the feed name 230, scope 235, and as-of/effective date 240, are generated for the new data feed instance (step 2055). Once the basic structure of the data feed is ready, information to be structured within the new data feed is retrieved from the external heterogeneous data sources 110a-110d (step 2060). Protocols necessary to decipher the retrieved information are then retrieved from the relevant external system (step 2065). The retrieved information is then converted and stored in the data feed according to the data feed protocol 105 based on the retrieved protocol (step 2065). The data, now structured according to the data feed protocol 105, is delivered to the data warehouse by transmitting the populated data feed instance to the data warehouse 115 (step 2070). The data feed is preferably stored by the data warehouse 115, either as a new entry in the case of new data, or overwriting old data if it is an update (step 2080). Finally, the data feeds platform 100 may receive an acknowledgement from the data warehouse 115 confirming that the data feed was received and stored (step 2085).

Figure 3:
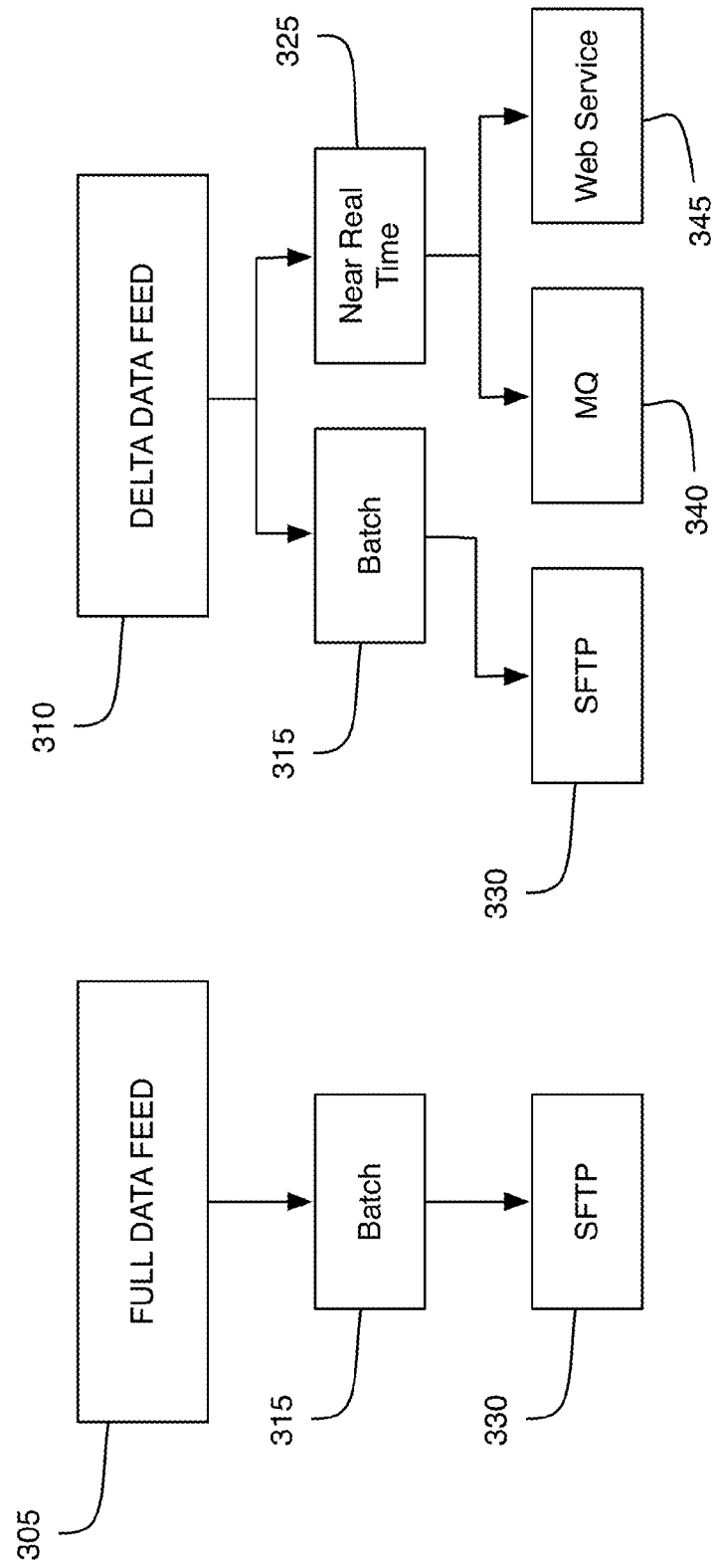
FIG. 3 is a high level representation of "full" data feed and "delta" data feed updating strategies, and the respective messaging services used with each.

FIG. 3 is a high level representation of "full" data feed 305 and "delta" data feed 310 updating strategies, and the respective messaging services used with each. For "full" data feeds, the feed contains the entire relevant universe of data for the data feed. Because the "full" data feed represent the complete dataset for the given source, "batch" mode transmission 315 is preferred. Under batch mode transmission 315, the data feed is scheduled to run at periodic intervals, which may be scheduled by time, or conditioned upon a specific event. The data feed may be prepared by extracting data from the underlying data sources (such as the external systems 110a-110d) at the desired time or upon detection of the desired event, processed, and then transmitted to the data warehouse 115.

For "delta" data transmissions 310, the feed contains only those portions of the universe of "full" data feed data that are changing, such as due to an update, insert or delete action. "Delta" data transmissions 310 may be transmitted in either "batch" mode 315 or "near real time" mode 325. "Near real time" mode 325 is an event-driven model for delivery of alterations of data in the data feed to the data warehouse 115. The occurrence of pre-specified events causes the upload of data feeds communicating the events to the data warehouse 115. For example, a significant change in the price of an important asset may cause a data feed to be created which will update the price of the important asset in the data warehouse 115. For some types of data updates may occur very rapidly. For example, the important asset may be a stock, which is constantly in flux during a trading day. Therefore, the underlying source system must have the capability to publish a large number of events indicating that a data change has occurred. The events indicating that a data change has occurred should have the appropriate identifiers to extract more detailed information from the external system or systems 110a-110d. The data change event listener 150 may be utilized by the data warehouse 115 to listen for events indicating that a data change has occurred. Once such an event is detected, it may draw the necessary data from the relevant external system or systems 110a-110d, have it processed by the data feeds platform 100 and store the resulting data feed.

A number of different messaging services may be utilized, such as Secure File Transfer Protocol ("SFTP") 330, Message Queue ("MQ") 340 or a Web Service request 345. For SFTP 330 messaging service utilization, the data feed may be packaged into a SFTP 330 feed file, with a name derived from the unique identification tuple data feed header 205, containing the feed data according to the data feed protocol 105 described above. The SFTP 330 feed file may be split into multiple files if there are size constraints on the receival of data.

For MQ 340 messaging service utilization, the data feed may be packaged into a MQ 340 message, embedded into the "CDATA" section of a root Extensible Markup Language element. The feed identifiers from the data feed header 205 may be included in a MQ 340 message header (besides being present within the feed itself). As with the SFTP 330 feed file, the MQ 340 message may be split into multiple messages if there are size restrictions. The MQ 340 messaging service may be used beneficially for "delta" data feed transmissions 310 operating in "near real time" updating 325, because "Delta" data feeds contain updated data that comes in relatively small-sized data chunks, and MQ 340 operates efficiently with small data chunks.

Web Service requests 345 may be utilized to package the information in a data feed, embedded into the "CDATA" section of a root Extensible Markup Language element (as with the MQ 340 messaging service). Again, the Web Service request 345 call may be split into multiple requests if size restrictions make the desired data feed too large for a single transmission. Web Service requests 345 may be typically used with "delta" data feeds 310 operating in "near real time" updating 325, because, as with the MQ 340 message service utilization, the web service requests 345 operate well with small chunks of data.

Figure 4:
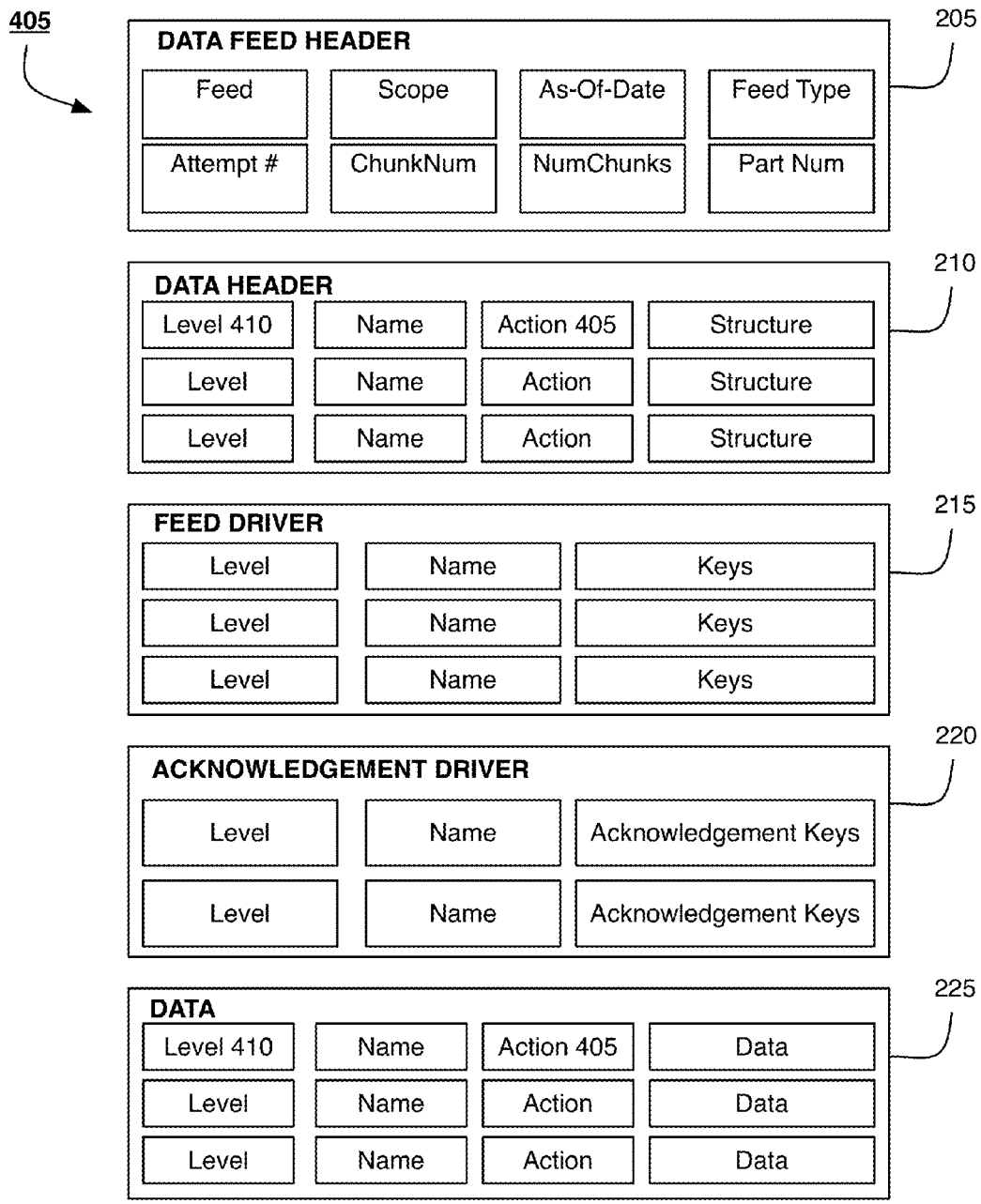
FIG. 4 is a high level representation of a "delta" data feed protocol data structure.

FIG. 4 is a high level representation of the "delta" data feed protocol 405 referenced above. The "delta" data feed protocol data structure 405 is essentially the same as the standard or "full" data feed protocol 105, having the same basic structure of a data header 210, feed driver 215, acknowledgement driver 220 and data 225. The only deviation is the addition of an "action" column 405 in the data header 210 and the data section 225. The "action" column 405 contains a value indicating what action is to be taken on the relevant data set specified by the level 410. The action column preferably has at least two possible values. As shown, the first value is "update," which designates an update or insert operation, wherein the information within the identified data set is to be updated or have new information inserted. The second value is "delete" which designates a delete operation, wherein the information within the data set may be, for example, removed entirely from the data warehouse 115 or marked as deleted or inactive.

Figure 5A:
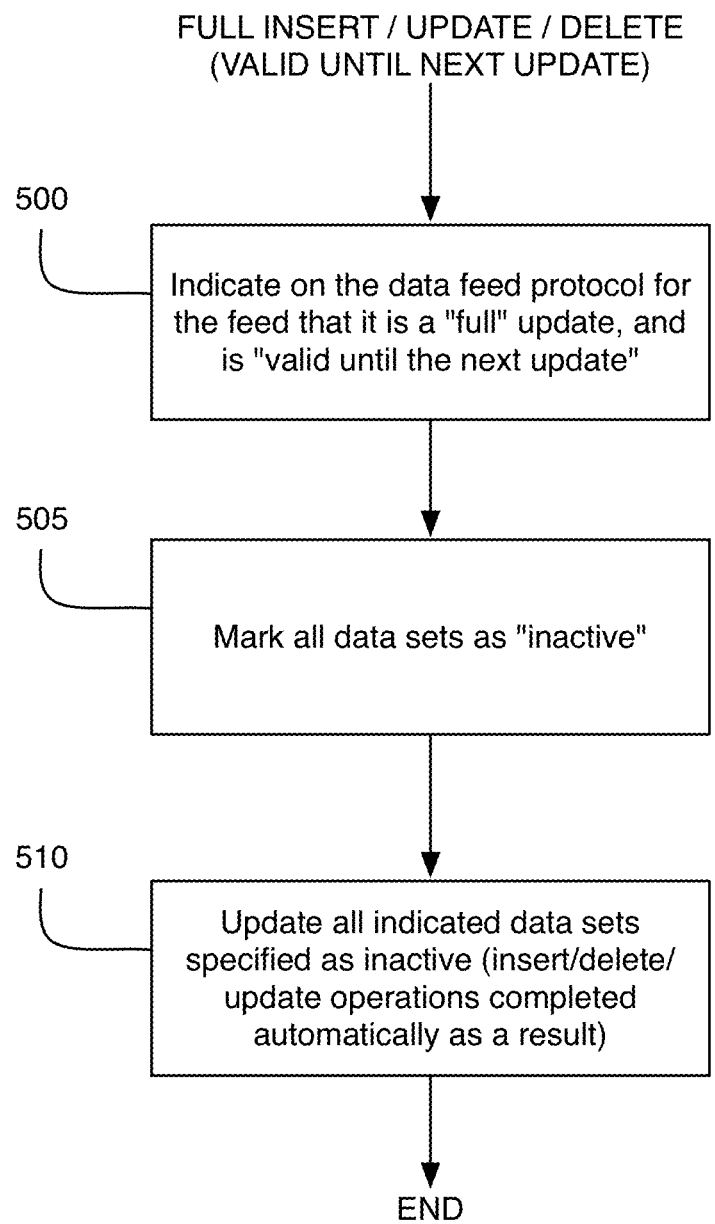
FIGS. 5A-5D are flow charts representing illustrative sequences of steps for implementing "full" data feed and "delta data feed updating.

FIG. 5A-5D are flow charts representing illustrative sequences of steps for implementing "full" data feed and "delta" data feed updating 305 and 310. FIG. 5A illustrates an illustrative sequence of steps for implementing updating of a data feed when the feed is marked for "full" data feed update operations 305 which are indicated "valid until next update" in the "scope" field 235 (step 500). All indicated data sets are marked inactive (step 505), and all inactive data sets are overwritten by the incoming data feed. Any insert, delete or update operations will be completed as a byproduct of the full data set being overwritten by the new incoming data set of the inbound data feed, regardless of whether there was an actual change in the underlying data.

Figure 5B:
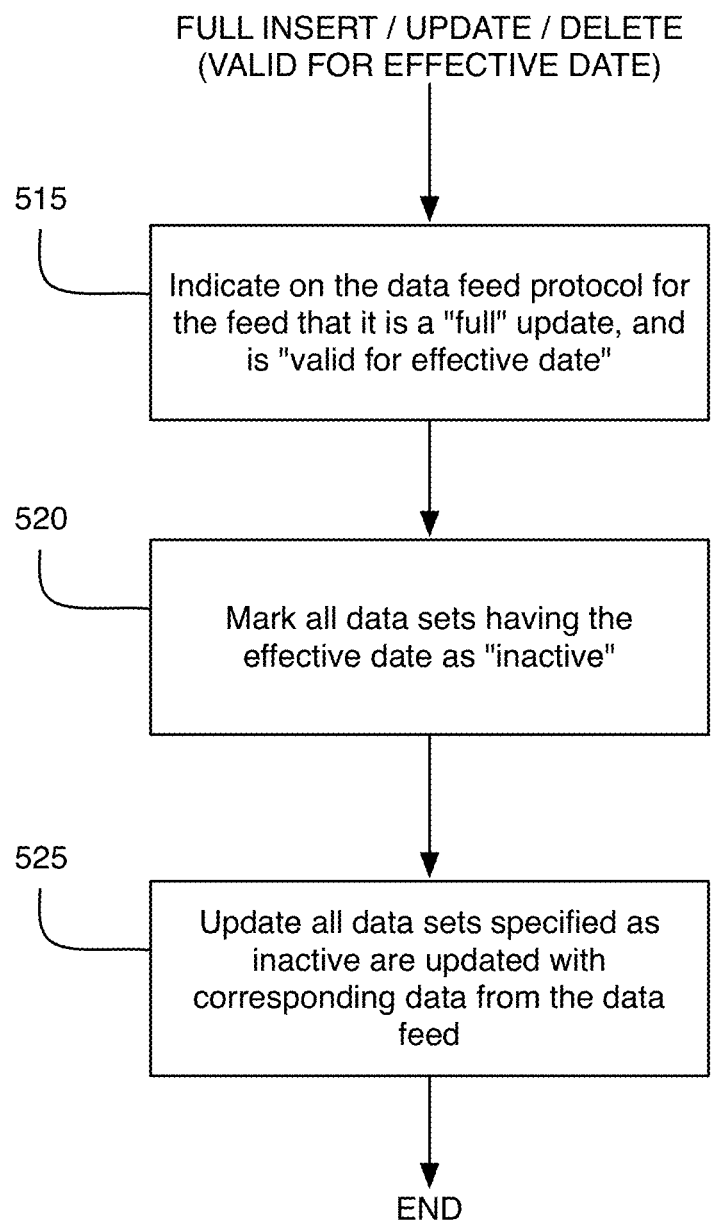

FIG. 5B illustrates an illustrative sequence of steps for implementing updating of a data feed when the feed is marked for "full" data feed update operations 305 which are indicated "valid for effective date" in the "scope" field 235 (step 515). Here, not all data sets are marked as inactive. Only data sets with the specified effective date (specified in the "as-of-date" field 240) are marked as inactive (step 520). Then, all data sets specified as inactive are updated with the data contained in the inbound data feed (step 525).

Figure 5C:
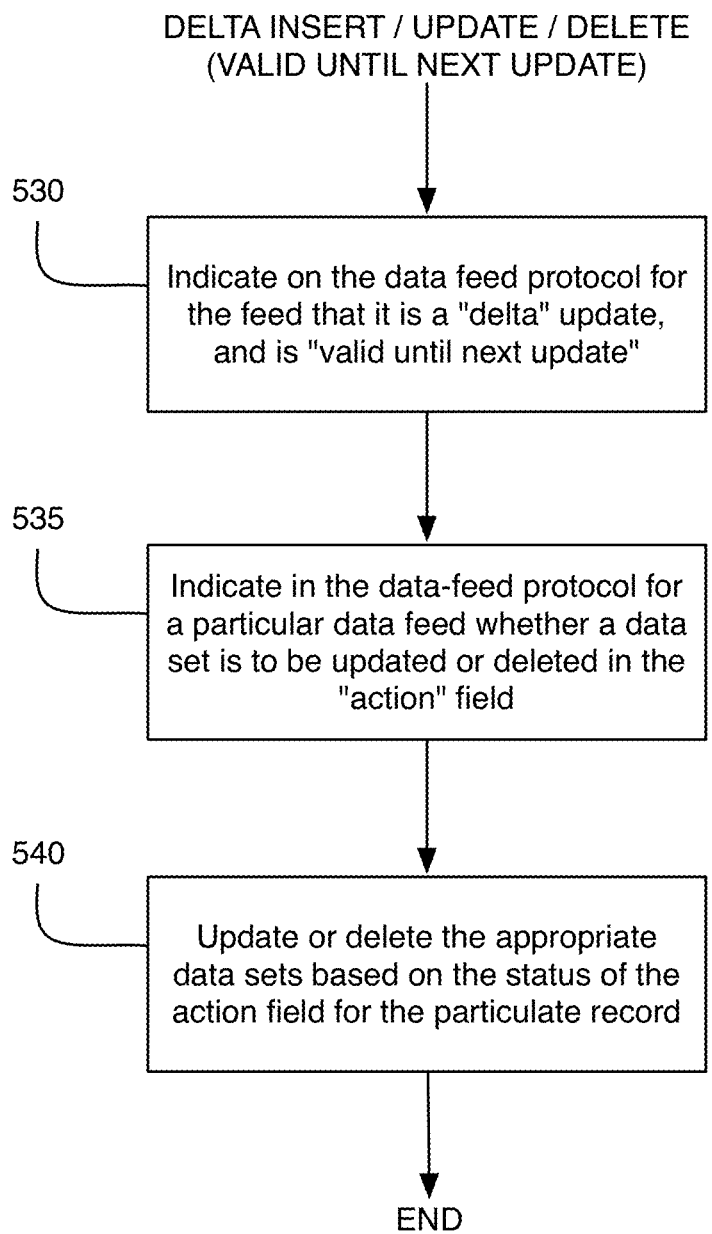

FIG. 5C illustrates an illustrative sequence of steps for implementing updating of a data feed when the feed is marked for "delta" data feed update operations 310 which are indicated "valid until next update" in the "scope" field 235 (step 530). Data sets that are to be updated or deleted are marked with the appropriate value in the "action" 405 field (step 535). The data sets are then updated according to the value in the "action" 405 field (step 540). Data sets having no indicator are left untouched, data sets having an "update" value are replaced with new data from the inbound data feed, and data sets having a "delete" value are marked for deletion, or treated as deleted (allowing the information is to be retained).

Figure 5D:
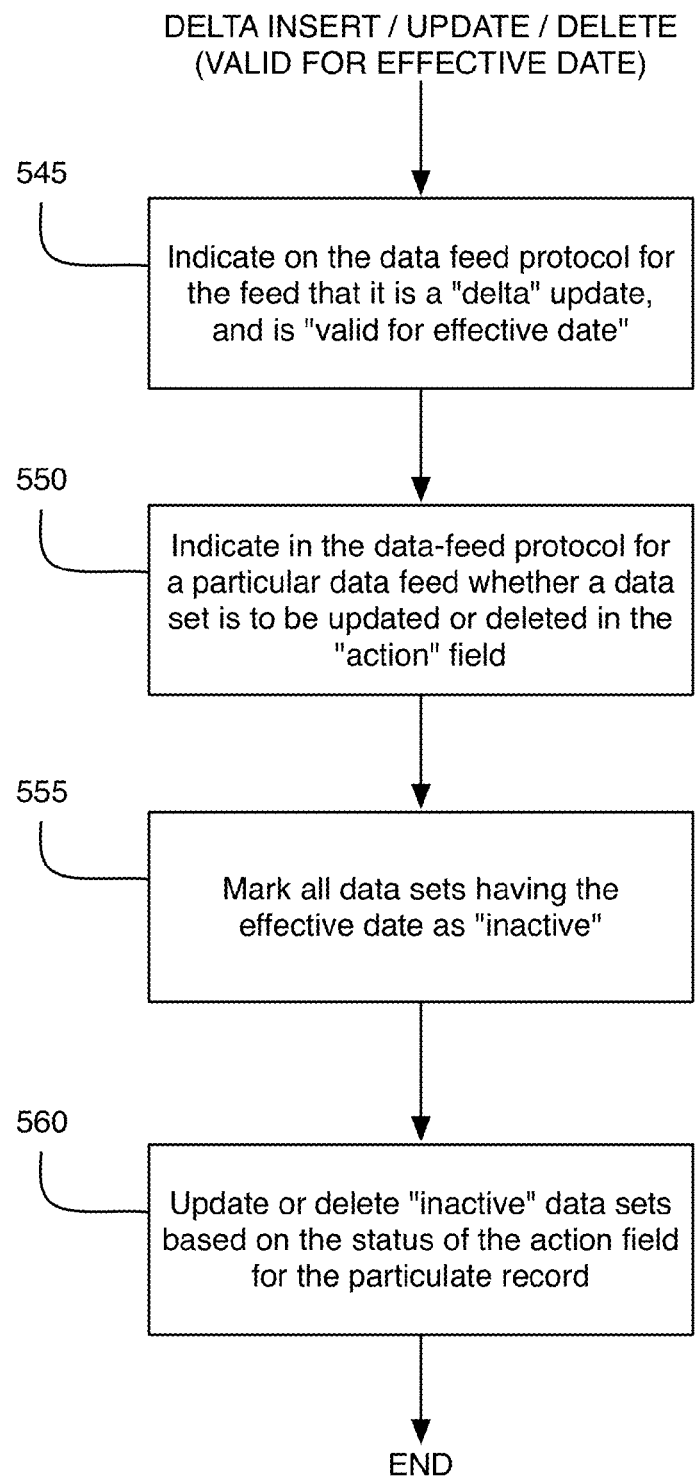

FIG. 5D illustrates an illustrative sequence of steps for implementing updating of a data feed when the feed is marked for "delta" data feed update operations 310 which are indicated "valid for effective date" in the "scope" field 235 (step 545). Data sets that are to be updated or deleted are marked with the appropriate value in the "action" 405 field (step 550). All data sets having the desired as-of/effective date are marked inactive (step 555). Then, all data sets marked inactive are altered according to the value in the "action" 405 field (step 550).

Figure 6:
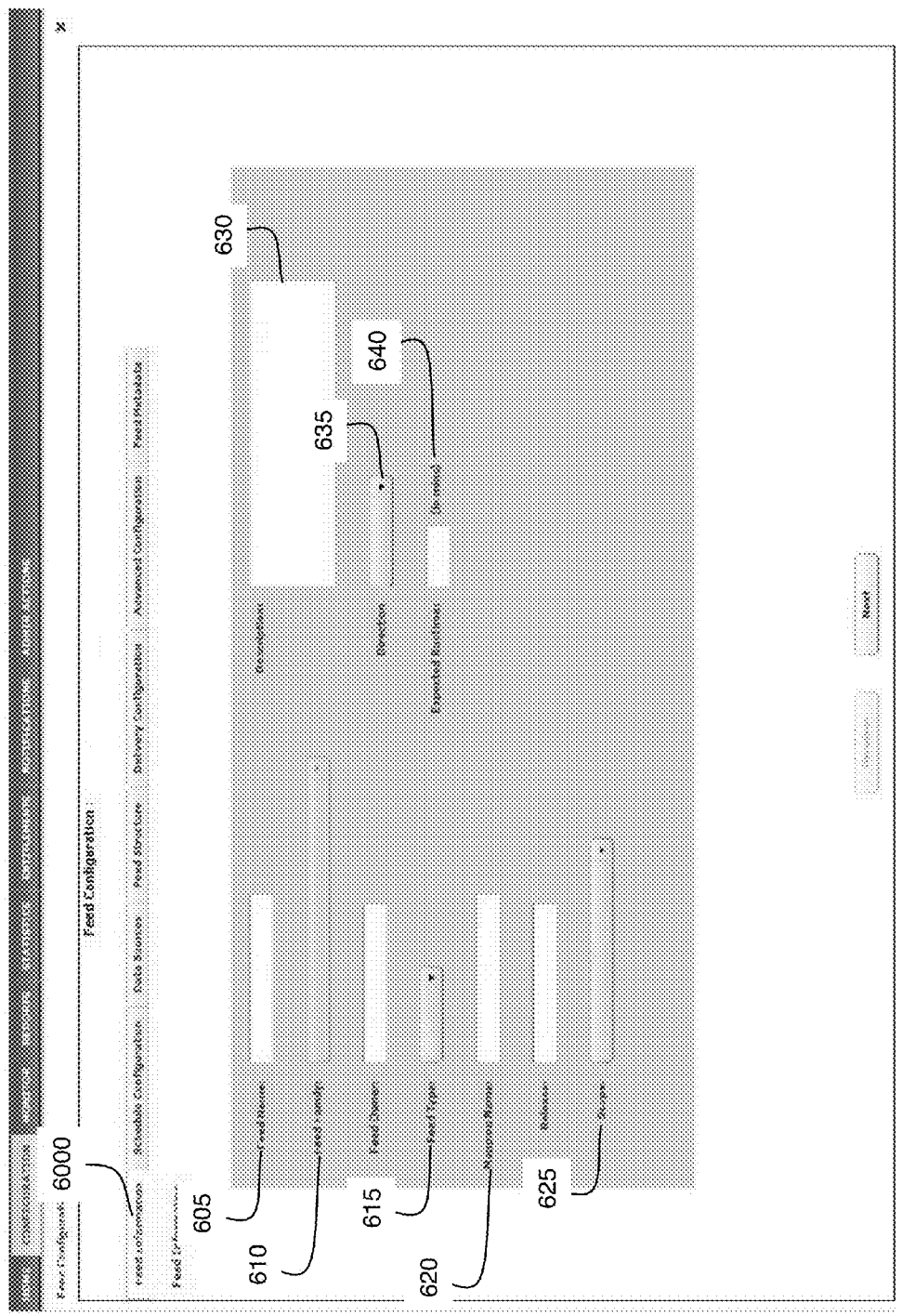

Still further, as a result of this simplified approach, a software wizard may be utilized to configure for the handling of new data feeds in the format of the data feed protocol 105. While the data feeds platform 100 and data feed protocol 105 do not require the use of a software wizard, its implementation may greatly ease the process of creating the specific protocol for a new data feed, allowing use by laymen with little computer programming experience. As shown, FIG. 6 represents a screen shot of an illustrative software wizard 600 that is used to configure the data feeds platform 100 and data feed protocol 105. It is understood that the software wizard 600 described herein is illustrative, and that any configuration of a software wizard may be utilized as required. The software wizard 600 guides a user in defining the data feed protocol of a new data feed. The illustrative software wizard 600 contains a first "tab" screen 6000 that allows entry of basic data feed information via data fields. The fields may include the feed name 605, feed family 610, feed type 615, mapping name 620, scope 625, description 630, direction 635 and expected runtime 640. Entry of characters into the feed name 605 thus define the feed name 230. The same is true for the feed type field 615 (defining the feed type 245), and scope 625 (defining the feed scope 235). The direction 635 indicates whether the feed is an outbound feed, inbound feed or an internal feed. The expected runtime 640 indicates a maximum amount of time within which the feed should be completed. The mapping name 620 may be required if the data feeds are loaded on external systems; this option allows the data feed to be mapped to another name for the purposes of operating within the external environment.

Figure 7:
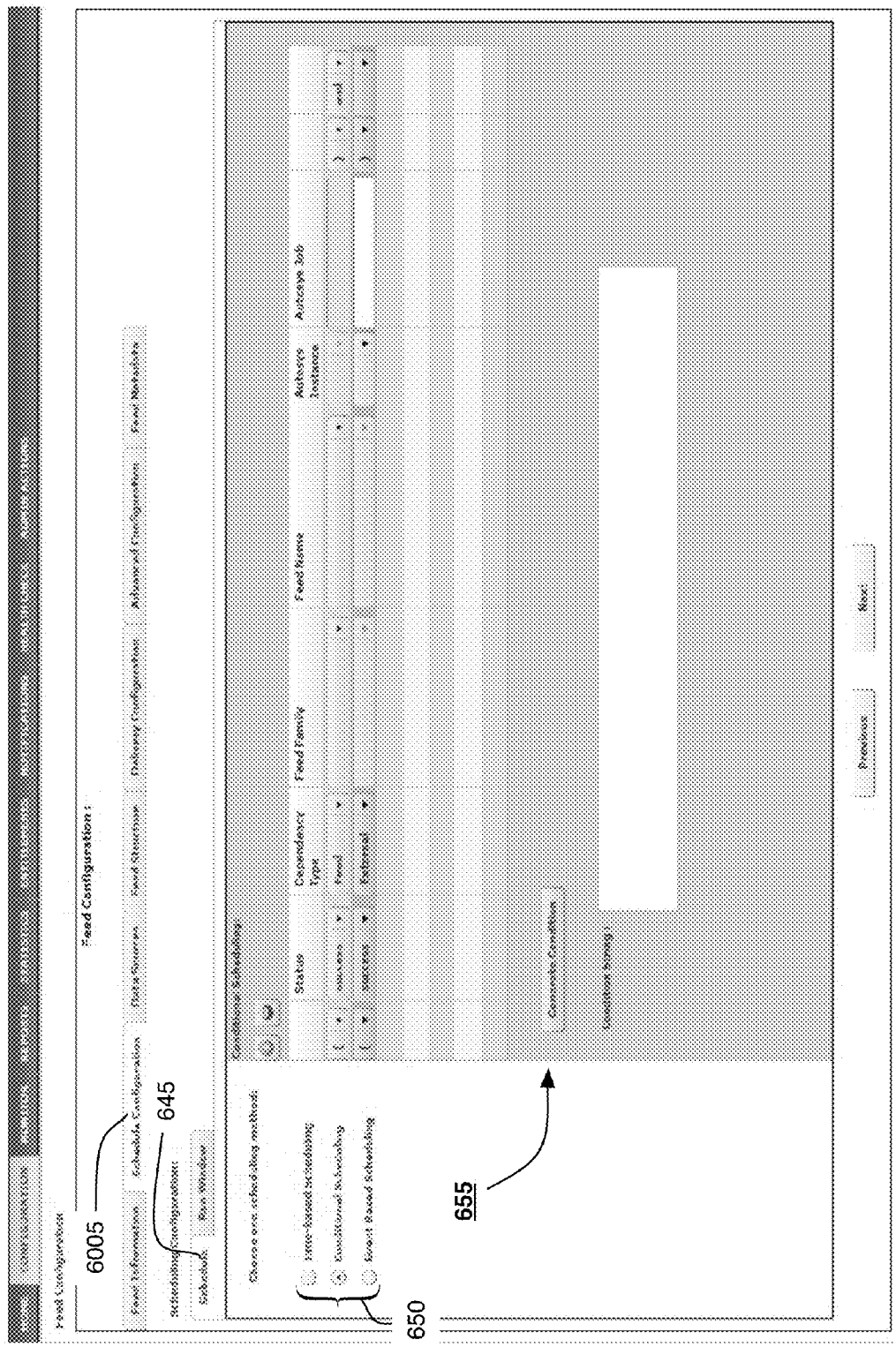

FIG. 7 represents a scheduling tab screen 6005 of the software wizard 600 that allows configuration of scheduling information for the relevant data feed. The scheduling tab screen 6005 allows a user to configure when and how updates for the data feed should be triggered. For example, time-based scheduling updates the data universe via the creation and transmission of a new data feed based on a regular time interval, conditional scheduling updates the data universe via the creation and transmission of a new data feed based upon the fulfillment of a condition (definable within the wizard) and event-based scheduling updates the data universe via the creation and transmission of a new data feed based on the detection of a listened-for event. The selector panel 650 allows a user to select between time-based, conditional or event-based scheduling. The customization panel 655 changes according to which type of scheduling is desired, with various options appropriate to customization and configuration of the selected scheduling type appearing in response to the selection of one of the options.

Figure 7A:
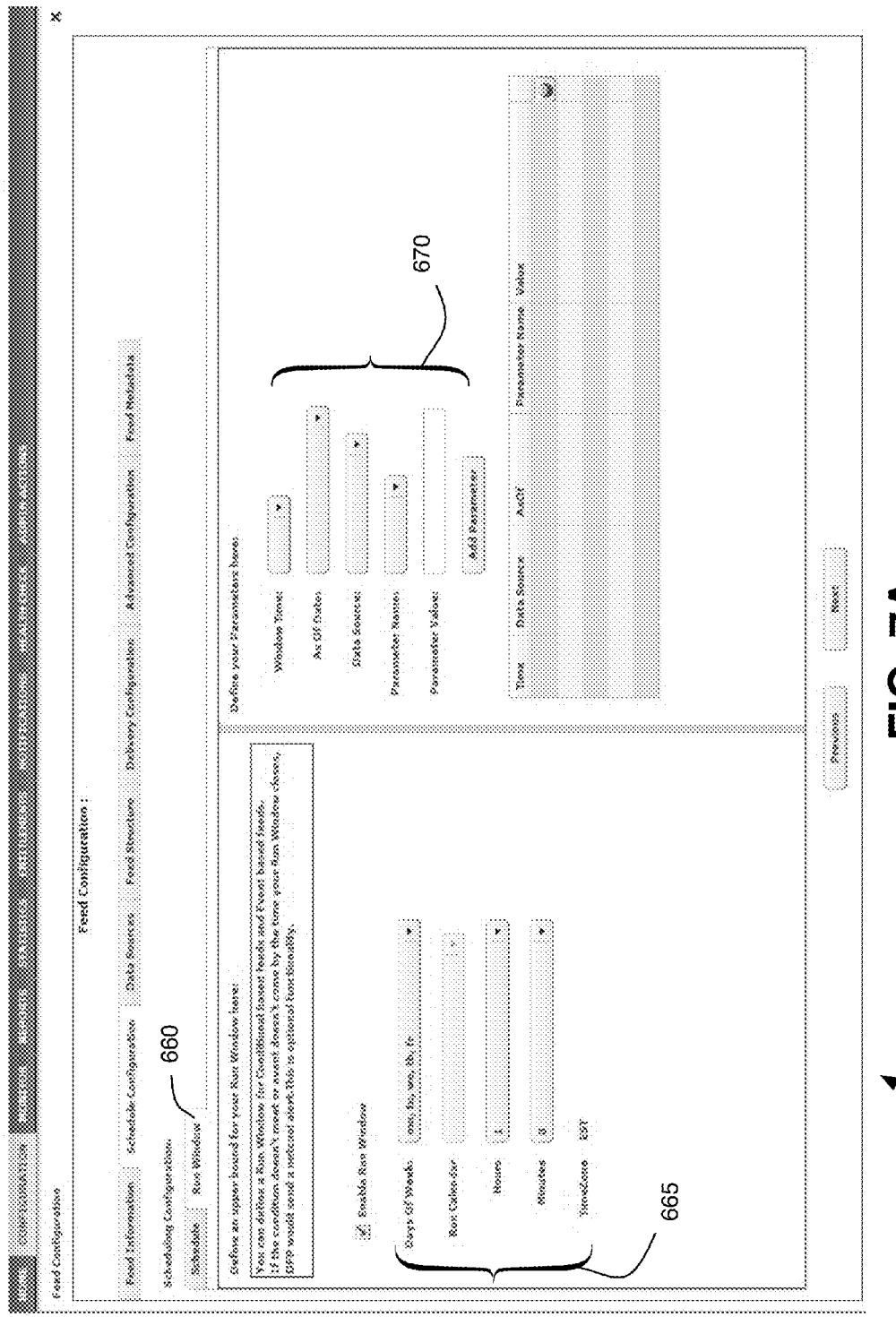

FIG. 7A represents a sub-tab screen 660 for "run windows" within the scheduling tab 6005. The run windows sub-tab screen 660 allows users to define time windows in which a data feed should complete operations. If the data feed exceeds the appropriate time boundary, an alert may be raised. A scheduling option panel 665 allows a user to schedule when the run window needs to be performed. A time option panel 670 allows a user to configure various options related to the run window itself, such as the length of time for the run window, the election of specific as-of-dates 240 to check, data sets to check from, etc.

Figure 8:
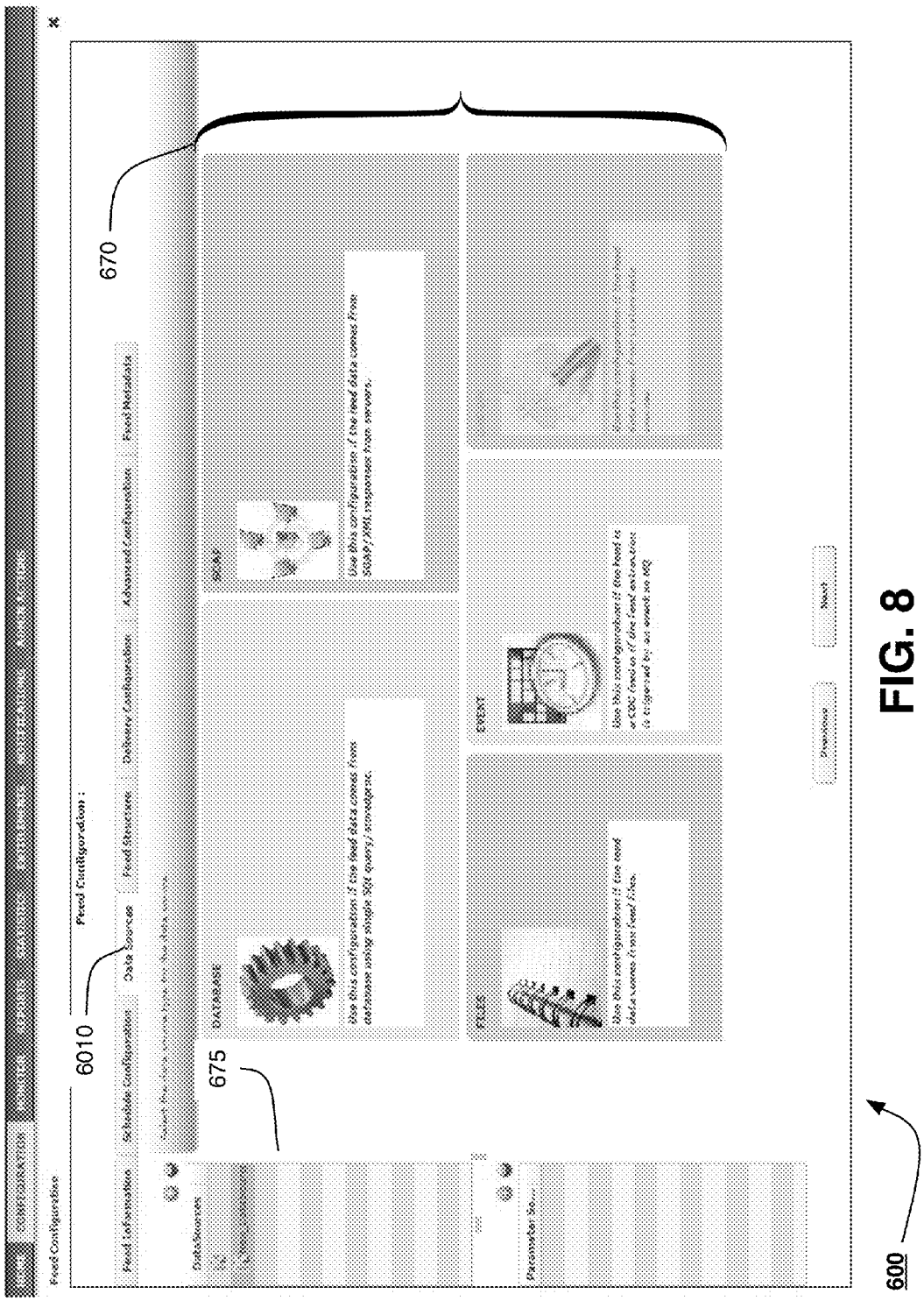

FIG. 8 represents a data sources tab screen 6010, which allows a user to add data sources (e.g., external systems 110a-110d) to the data feed so the systems upon which the data feed is dependent are known and defined. A data source pane 670 allows selection and configuration of different types of data sources, such as databases, "SOAP" (or Hyperextensible Mark-Up Language) sources, data from computer files, data from detected events, etc.

Figure 8A:
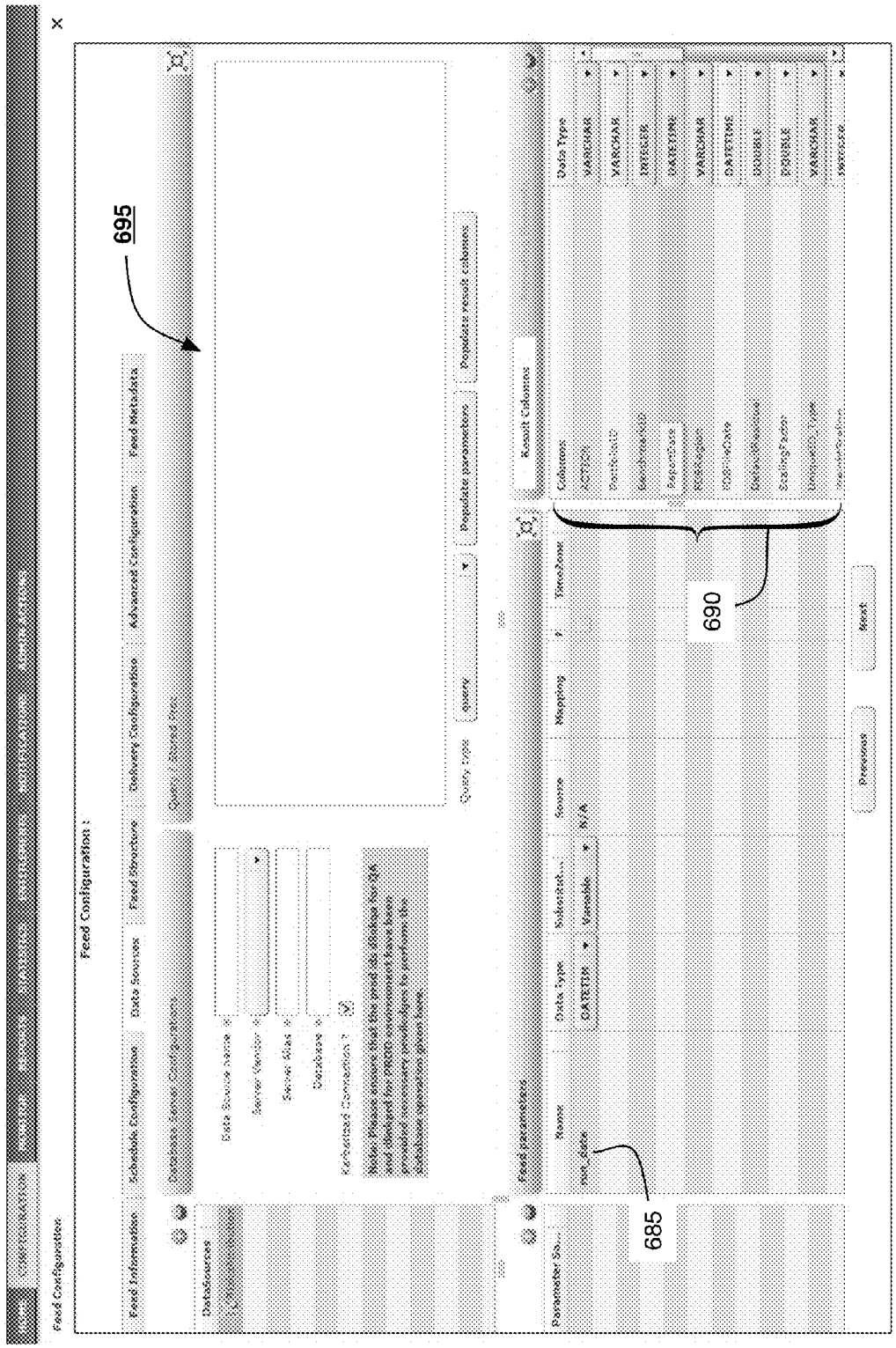

FIG. 8A represents a configuration sub-screen for the data sources tab 6010. Each external system 110a-110d may have specific requirements for interaction. The configuration screen allows a user to set and define the way in which the data feed interacts with each external system 110a-110d. An editor pane 695 may allow a user to enter query or stored procedures for storage and association. A parameter pane 685 may display a list of parameters that may be supplied to the query or stored procedure defined in the editor pane 695. A result pane 690 may display one or more result sets from a recently executed query.

Figure 9:
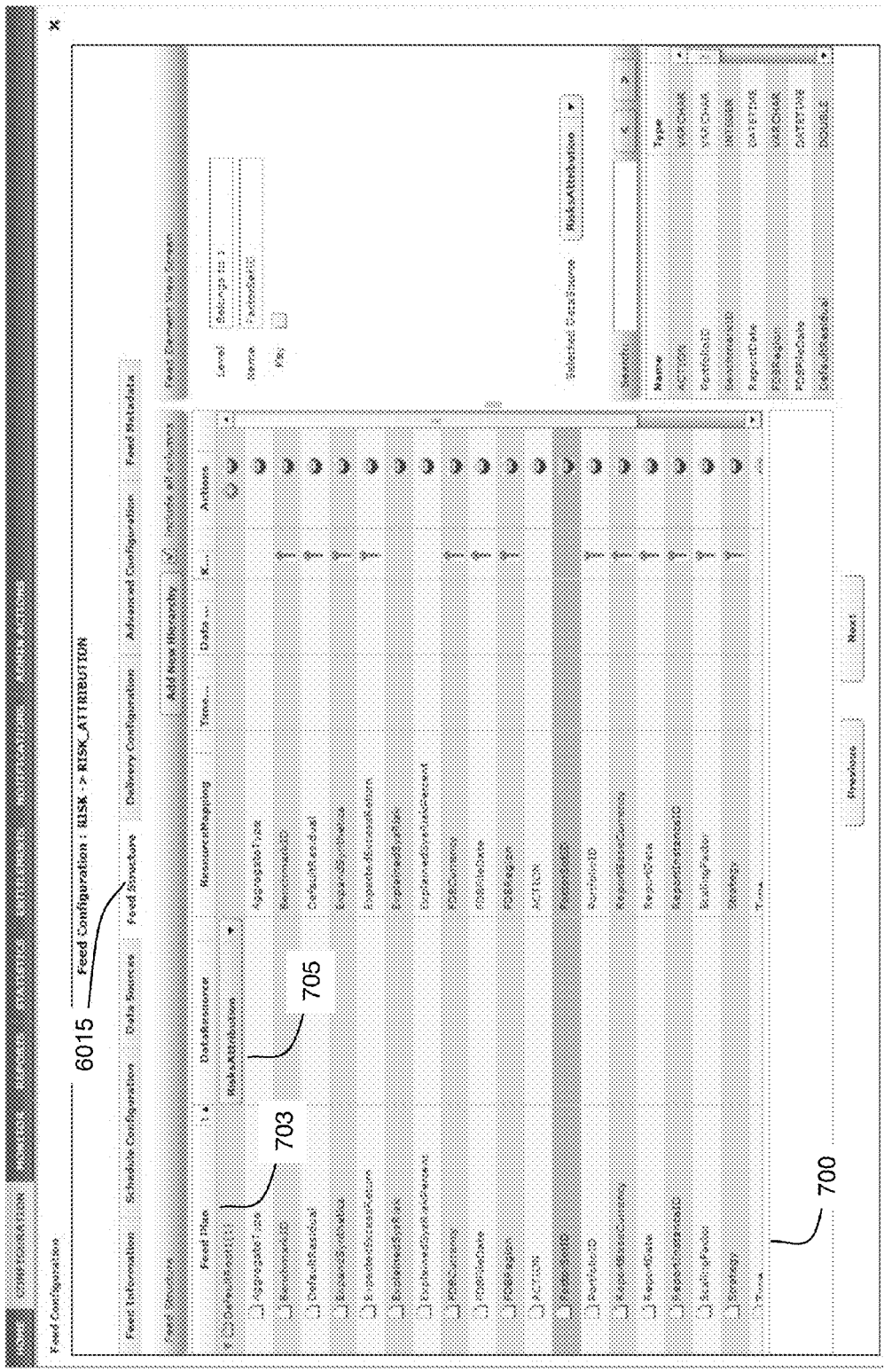

FIG. 9 represents a feed structure tab screen 6015, which allows a user to define how data will be represented in the data feed file under the data header 210. As shown, feed structure pane 700 contains a listing of feed plans 703, the root of which may be associated with at least one data resource via a data resource associator 705 that provides a drop-down menu of available data resources. As described above, the data structure may be designed as a hierarchal representation of data. Therefore, hierarchal levels may be defined under the feed plan 703.

Figure 10:
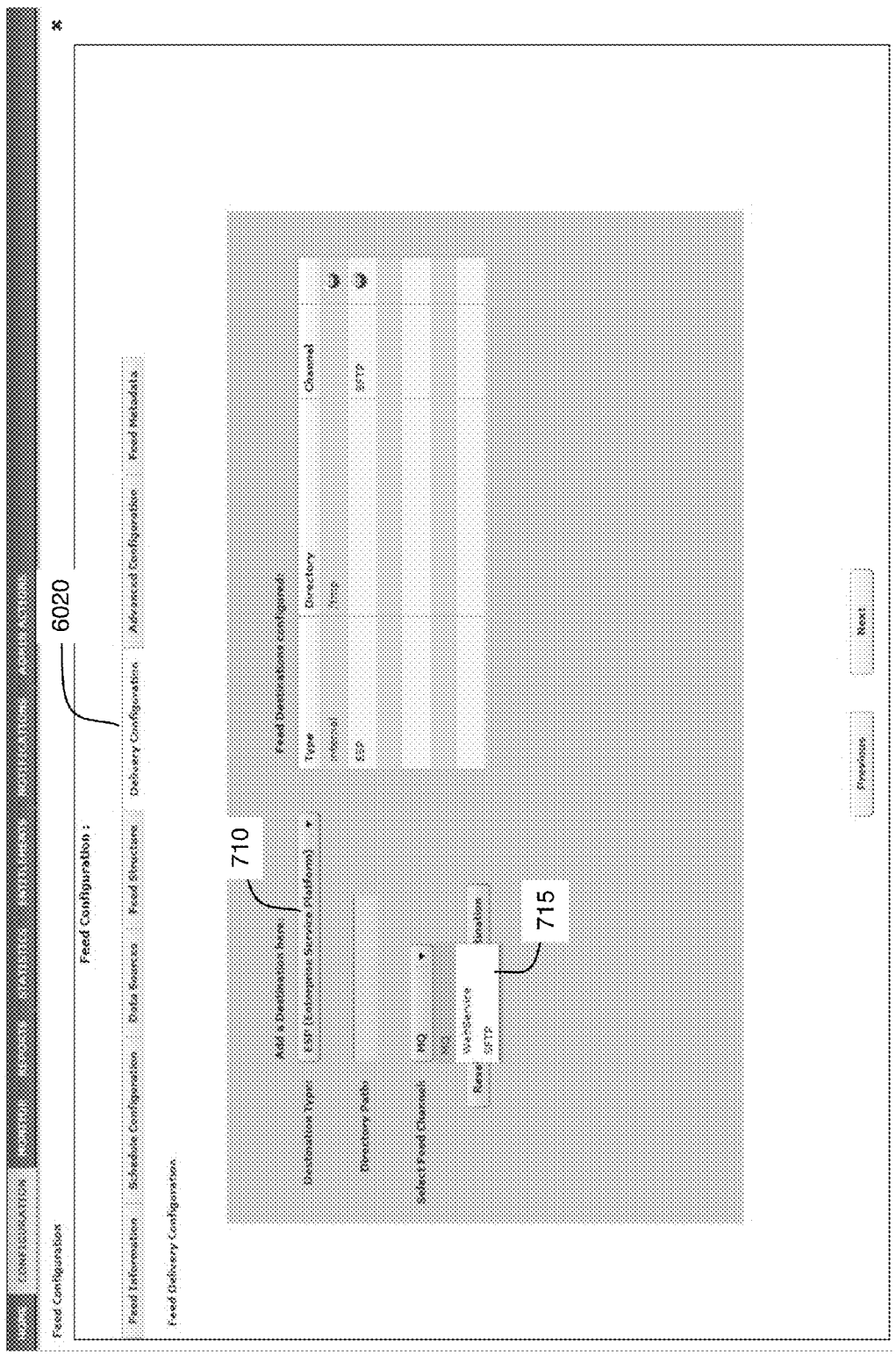

FIG. 10 represents a delivery configuration tab screen 6020, allowing a user to define one or more delivery modes and channels for the relevant data feed. A destination type selector menu 710 allows selection of at least one listed destination type. A messaging type selector menu 715 allows the user to select MQ 340, SFTP 330 or Web Service request 345 as the delivery channel for the relevant data feed.

Figure 11:
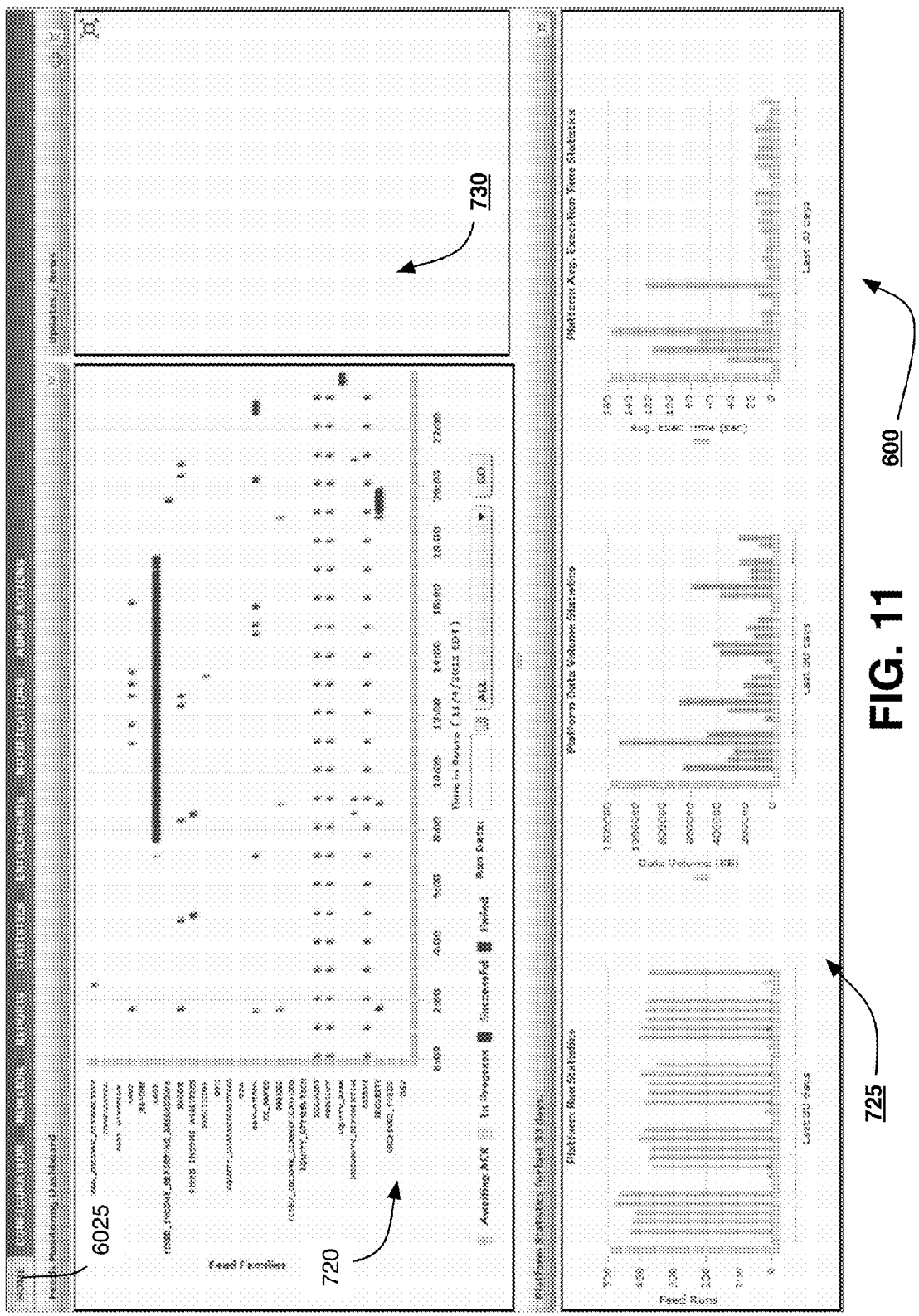

FIG. 11 represents a home tab screen 6025 that allows a user to monitor different data feeds and their respective statuses for a selected time period. The feed monitoring dashboard 720 displays a list of current data feeds and provides a visual representation of their respective runtimes. A news board 730 may display useful information, such as information, news or announcements related to the usage of the data feeds platform 100. A statistics board 725 displays various statistics regarding one or more data feeds. Any organizational statistics may be generated and displayed herein as desired by the user.

Figure 12:
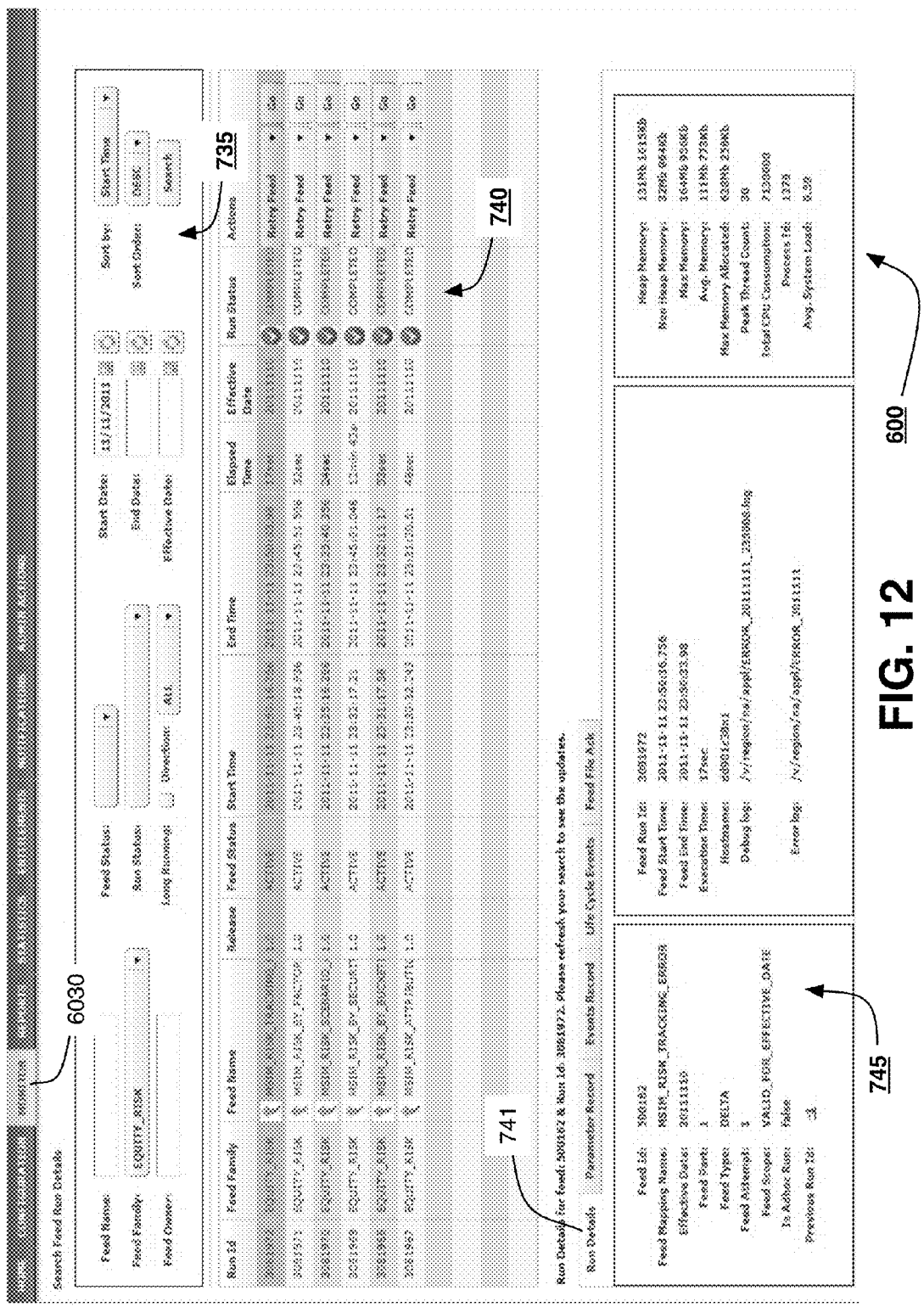

FIG. 12 represents a monitor tab screen 6030 which enables searching of historic data feed runs, displaying detailed information about any selected historical data feed run. As shown, a search option pane 735 displays various search fields for historic data feeds by various attributes, such as feed name, feed family, feed owner, feed status, run status, start date, end date, effective date, etc. A search results pane 740 displays the results of the search, along with tangential identifying data, such as the feed family, feed name, feed status, start time, end time, elapsed time, etc. Selection of one of the data feeds displayed in the search results pane 740 may cause the data feed detail pane 745 to display more specific information regarding the selected data feed run, when the run details sub-tab 741 is selected.

Figure 13:
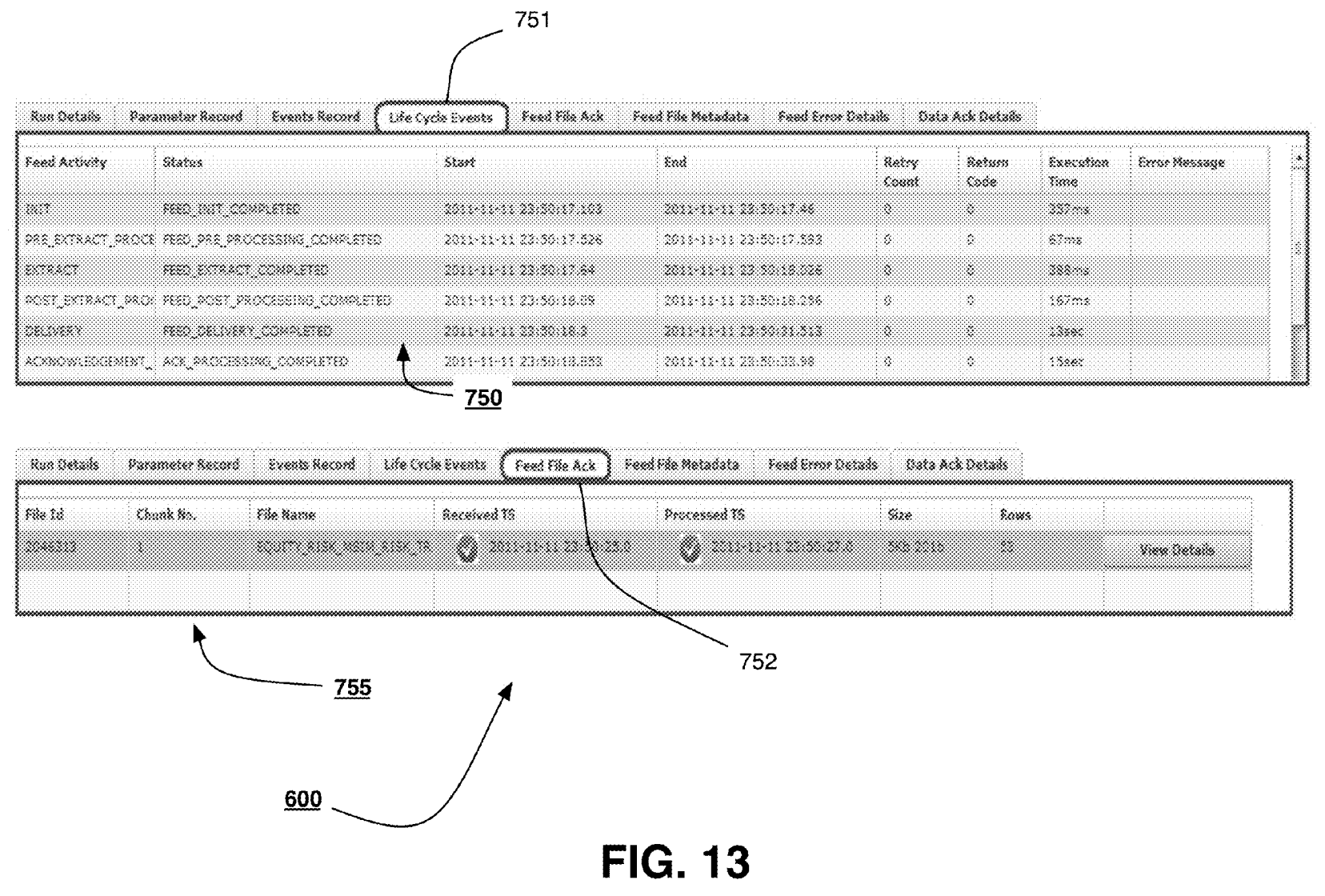

FIG. 13 represents a life cycle events screen 742 under the monitor tab 6030, which shows all lifecycle events that transpired during the operation of the data feed, via the life cycle event pane 750. The illustrative software wizard may also contain a feed file acknowledgements tab 752, which may show all acknowledgements received during the operation of the data feed, via the acknowledgement pane 755.

Figure 14:
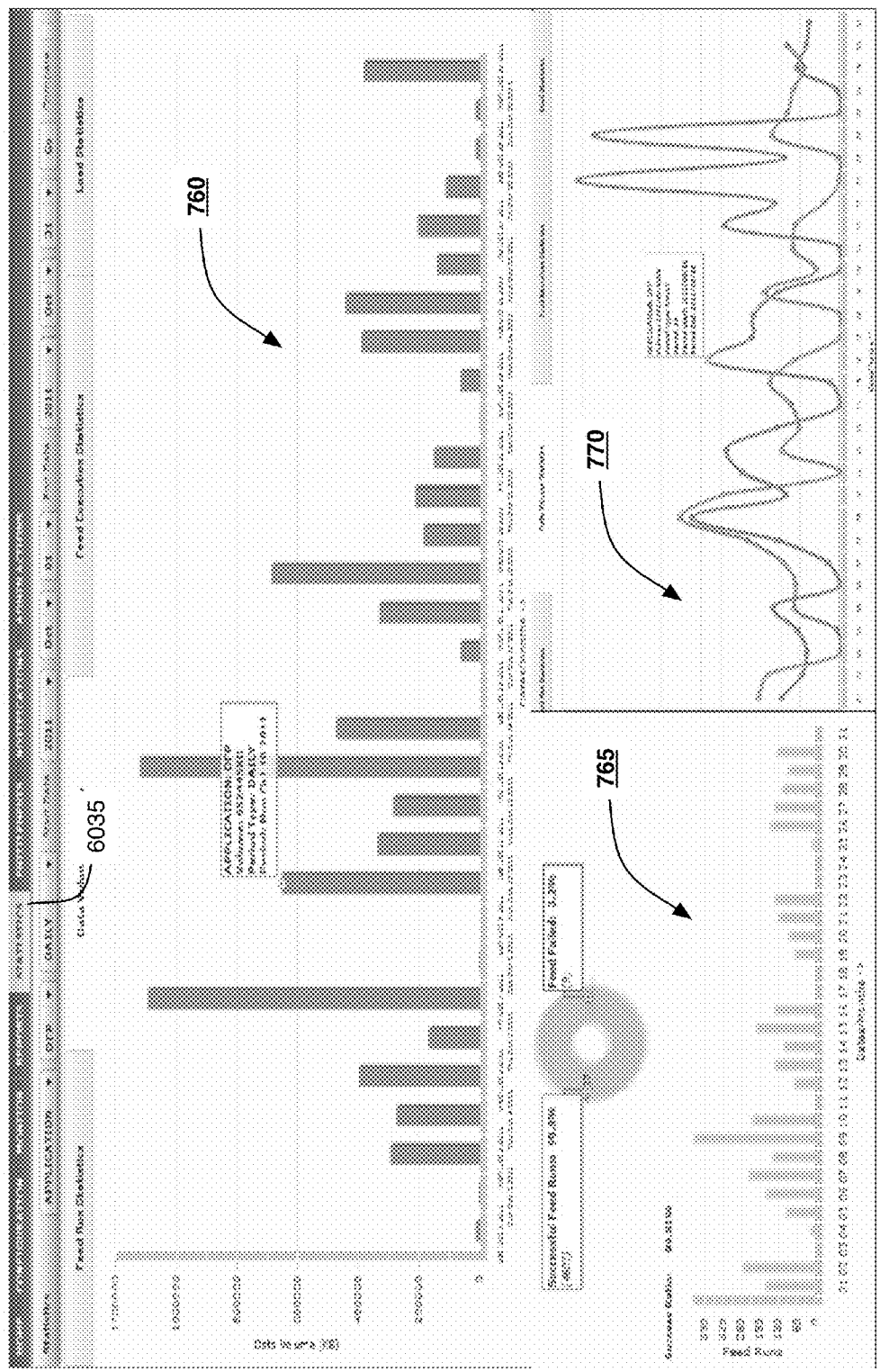

FIG. 14 represents a statistics tab 6035, which contains a number of sub-tabs such as feed run statistic, data volume, feed execution statistics and lead statistics. Only data volume statistics are illustrated here for reference. As shown, a data volume pane 760 illustrates an analysis of data volume per a unit of time. A feed health report 765 illustrates the number of successful data feed runs as measured against a unit of time. A data feed comparison pane 770 compares compare one unit of time against another in terms of the number of data feeds executed. Any other analyses As discussed above, the data feeds platform and data feed protocol may be implemented utilizing one or more computing systems of varying configurations. For instance, the computing systems may be combined as a single computing system. Each computing system preferably includes computing components for executing computer program instructions and processes. These components may include a central processing unit (CPU), memory, input/output (I/O) devices, and a network interface.

The CPU processes and executes computer program instructions. Random access memory (RAM) and/or fast access cache memory preferably provides fast data supply to CPU. Long-term storage may be provided as a more permanent form of computer memory, and may be, for example, a hard disk, optical disk, flash memory, solid-state memory, tape, or any other type of memory.

The I/O device(s) permit human interaction with the computer system, such as (but not limited to) a mouse, keyboard and computer display. I/O device(s) may also include other interactive devices, such as (but not limited to) touch screens, digital stylus, voice input/output, etc.

The network interface device may provide the computing system with access to a network, which may be a wireless or wired connection. The network may be, for example, the Internet, a corporate intranet, or any other computer network through which the computing system may connect to or otherwise communicate with other computers and databases, such as (but not limited to) the external systems 110a-110d and 165a-165d and any other databases represent other computerized systems or databases for specialized information that may be necessary for implementation of the data feeds platform 100 and data feed protocol 105.

Software process or processes and executables (such as those operating on the data feed platform 100 or data warehouse 115) on the computing system may be used to provide human interfaces (such as a graphical user interface), and to store and initiate computer program instructions used to process and analyze data. Computer program code for carrying out operations described herein may be written in any combination of one or more programming languages, including an object oriented programming language such as Java, C++, C# or the like and conventional procedural programming languages, such as the "C" programming language or similar programming languages. The program code may execute entirely on the computing system, partly on the computing system, as a stand-alone software package, partly on the computing system and partly on a remote computer or server, or entirely on a remote computer or server.

This application was described above with reference to flow chart illustrations and/or block diagrams of methods, apparatus (systems) and computer program products according to one or more embodiments. It is understood that some or all of the blocks of the flow chart illustrations and/or block diagrams, and combinations of blocks in the flow chart illustrations and/or block diagrams, can be implemented by computer program instructions. The computer program instructions may also be loaded onto the computing system to cause a series of operational steps to be performed on the computer to produce a computer implemented process such that the instructions that execute on the computer provide processes for implementing the functions/acts specified in the flowchart and/or block diagram block(s). These computer program instructions may be provided to the CPU of the computing system such that the instructions, which execute via the CPU of the computing system, create means for implementing the functions/acts specified in the flowchart and/or block diagram block(s).

These computer program instructions may also be stored in a computer-readable medium that can direct the computing system to function in a particular manner, such that the instructions stored in the computer-readable medium implement the function/act specified in the flowchart and/or block diagram block or blocks. Any combination of one or more computer usable or computer readable medium(s) may be utilized. The computer-usable or computer-readable medium may be, for example (but not limited to), an electronic, magnetic, optical, electromagnetic, infrared, or semiconductor system, apparatus, device, or propagation medium. More specific examples (a non-exhaustive list) of the computer-readable medium include the following: an electrical connection having one or more wires, a portable computer diskette, a hard disk, a random access memory, a read-only memory, an erasable programmable read-only memory (e.g., EPROM or Flash memory), an optical fiber, a portable compact disc read-only memory, an optical storage device, a transmission media such as those supporting the Internet or an intranet, or a magnetic storage device. Any medium suitable for electronically capturing, compiling, interpreting, or otherwise processing in a suitable manner, if necessary, and storing into computer memory may be used. In the context of this disclosure, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in base band or as part of a carrier wave. The computer usable program code may be transmitted using any appropriate medium, including (but not limited to) wireless, wire line, optical fiber cable, RF, etc.

Having described and illustrated the principles of this application by reference to one or more preferred embodiments, it should be apparent that the preferred embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A method of implementing a data feeds platform, comprising:
    receiving, using a processor, data in one of a plurality of heterogeneous data formats;
    based upon a data feeds protocol that specifies a feed header specifying attributes necessary to identify a new data feed, the data feeds protocol further specifying a data header specifying data nodes, the data header delineating an external data structure, each data node having an internal data structure, and wherein the feed header defines at least a scope of the data feed, the scope being either "valid until the next update", or "valid for the effective date," and at least an as-of date, indicating a date to which the data feed is being transmitted, the method further including, using the processor, extracting
        a) the specified attributes from the data and storing them in a new data feed's feed header, and
        b) subsets of the data and organizing them as data nodes, the subsets having a structure corresponding to the internal data structure;
    storing, using the processor, the data in a data section of the data feed according to the external data structure of the data header; and
    transmitting the new data feed to a data warehouse.

2. The method of claim 1, wherein the feed header defines at least a type of the data feed, the type being either a "full" type indicating that the data feed comprises a full data universe of the data, and a "delta" type indicating that the data feed comprises only portions of the data for which a change is being made.

3. The method of claim 2, wherein the data header specifies, when the type is the "delta" type, an "action" field, wherein the "action" field may be an "update" operation, or a "delete" operation, at least one of the data nodes being associated with a unique "action" field.

4. The method of claim 3, further comprising transmitting an update data feed to the data warehouse to update the data stored in the data warehouse as a result of the transmission of the new data feed.

5. The method of claim 4, wherein the update data feed's scope is "valid until the next update," and the type is the "full" type, the method further comprising:
    updating the data in the data warehouse by:
        sending the update data feed related to the data to the data warehouse, the data warehouse updating the data by overwriting the data with the stored data from the data section of the sent update data feed.

6. The method of claim 4, wherein the update data feed's scope is "valid for the effective date," and the type is the "full" type, the method further comprising:
    updating the data in the data warehouse by:
        sending the update data feed related to the data to the data warehouse,
        the data warehouse marking all data nodes of the data in the data warehouse having an as-of date corresponding to the as-of date of the sent update data feed,
        the data warehouse updating all data nodes of the data that were marked with data nodes from the data section of the update data feed.

7. The method of claim 4, wherein the update data feed's scope is "valid until the next update," and the type is the "delta" type, the method further comprising:
    sending the update data feed related to the data to the data warehouse,
    the data warehouse examining an "action" field of the update data feed for each data node of the data in the data warehouse,
    the data warehouse deleting a data node of the data in the data warehouse if a corresponding data node from the sent update data feed's "action" field is marked "delete," and
    the data warehouse updating a data node of the data in the data warehouse if a corresponding data node from the sent update data feed's "action" field is marked "update."

8. The method of claim 4, wherein the update data feed's scope is "valid for the effective date," and the type is the "delta" type, the method further comprising:
    sending the update data feed related to the data to the data warehouse,
    the data warehouse marking all instances of the data in the data warehouse having an as-of date corresponding to the as-of date of the sent update data feed,
    the data warehouse deleting a data node of the data in the data warehouse if the data node is marked, and a corresponding data node from the sent update data feed's "action" field is marked "delete," and
    the data warehouse updating a data node of the data in the data warehouse if the data node is marked, a corresponding data node from the sent update data feed's "action" field is marked "update."

9. The method of claim 1, wherein the data header defines a hierarchal tree external data structure of the data to be transmitted in the data feed.

10. The method of claim 1, wherein the data feeds protocol further specifies a feed driver specifying some data nodes as actionable such that a future action on the data are applied only if the data node to which the future action is to be applied was specified as actionable.

11. The method of claim 1, wherein the data feeds protocol further specifies an acknowledgement driver specifying some data nodes such that when a future action is performed on a specified data node, a special acknowledgement is generated for the future action.

12. The method of claim 1, further comprising displaying a graphic user interface to a user to allow run-time configuration of new and existing data feeds from the data feeds platform.

13. A data feeds platform, comprising:
a computer processor; and
computer memory, within which is defined a data feed protocol, the data feed protocol comprising:
a feed header, the feed header defining at least one identification attribute of the data feed,
a data header, the data header defining a data structure of data to be transmitted in the data feed, the data structure comprising data nodes, each data node corresponding to a subset of the data, and
a data section, the data section storing the data according to the data structure defined in the data header;
wherein the computer memory contains program instructions, which, when executed, causes the computer processor to:
define, within the feed header, at least a scope of the data feed, the scope being either "valid until the next update", or "valid for the effective date;";
define, within the feed header, at least an as-of date, indicating a date to which the data feed is being transmitted;
store a plurality of heterogeneous data protocols,
receive, using the computer processor, a data input in one of the plurality of heterogeneous data protocols;
convert, using the computer processor, the data input from the one of the plurality of heterogeneous data protocols to the data feed protocol, creating the data feed; and
transmit the data feed to a data warehouse.

14. The data feeds platform of claim 13, wherein the program instructions further comprise:
defining, within the feed header, at least a type of the data feed, the type being either a "full" type indicating that the data feed comprises a full data universe of the data, and a "delta" type indicating that the data feed comprises only portions of the data for which a change is being made.

15. The data feeds platform of claim 14, wherein the program instructions further comprise specifying, within the data header, when the type is the "delta" type, an "action" field, wherein the "action" field may be an "update" operation, or a "delete" operation, at least one of the data nodes being associated with a unique "action" field.

16. The data feeds platform of claim 15, wherein an update data feed's scope is "valid until the next update," and the type is the "full" type, the program instructions further comprising:
updating the data in the data warehouse by:
sending the update data feed related to the data to the data warehouse, the data warehouse updating the data by overwriting the data with the stored data from the data section of the sent update data feed.

17. The data feeds platform of claim 15, wherein an update data feed's scope is "valid for the effective date," and the type is the "full" type, the program instructions further comprising:
updating the data in the data warehouse by:
sending the update data feed related to the data to the data warehouse,
the data warehouse marking all data nodes of the data in the data warehouse having an as-of date corresponding to the as-of date of the sent update data feed, and
the data warehouse updating all data nodes of the data that were marked with data nodes from the data section of the update data feed.

18. The data feeds platform of claim 15, wherein an update data feed's scope is "valid until the next update," and the type is the "delta" type, the program instructions further comprising:
sending the update data feed related to the data to the data warehouse,
the data warehouse examining an "action" field of the update data feed for each data node of the data in the data warehouse,
the data warehouse deleting a data node of the data in the data warehouse if a corresponding data node from the sent update data feed's "action" field is marked "delete," and
the data warehouse updating a data node of the data in the data warehouse if a corresponding data node from the sent update data feed's "action" field is marked "update."

19. The data feeds platform of claim 15, wherein an update data feed's scope is "valid for the effective date," and the type is the "delta" type, the program instructions further comprising:
sending the update data feed related to the data to the data warehouse,
the data warehouse marking all instances of the data in the data warehouse having an as-of date corresponding to the as-of date of the sent update data feed,
the data warehouse deleting a data node of the data in the data warehouse if the data node is marked, and a corresponding data node from the sent update data feed's "action" field is marked "delete," and
the data warehouse updating a data node of the data in the data warehouse if the data node is marked, a corresponding data node from the sent update data feed's "action" field is marked "update."

20. The data feeds platform of claim 13, wherein the program instructions further comprise defining, within the data header, a hierarchal tree data structure of the data to be transmitted in the data feed.

21. The data feeds platform of claim 13, wherein the data feeds protocol further specifies a feed driver specifying some data nodes as actionable such that a future action on the data are applied only if the data node to which the future action is to be applied was specified as actionable.

22. The data feeds platform of claim 13, wherein the data feeds protocol further specifies an acknowledgement driver specifying some data nodes such that when a future action is performed on a specified data node, a special acknowledgement is generated for the future action.

23. The data feeds platform of claim 13, further comprising displaying a graphic user interface to a user to allow run-time configuration of new and existing data feeds from the data feeds platform.

* * * * *